US009710219B2

(12) United States Patent
Matsuoka

(10) Patent No.: US 9,710,219 B2
(45) Date of Patent: Jul. 18, 2017

(54) SPEAKER IDENTIFICATION METHOD, SPEAKER IDENTIFICATION DEVICE, AND SPEAKER IDENTIFICATION SYSTEM

(71) Applicant: Panasonic Intellectual Property Corporation of America, Torrance, CA (US)

(72) Inventor: Tomomi Matsuoka, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 24 days.

(21) Appl. No.: 14/420,749

(22) PCT Filed: Jun. 4, 2014

(86) PCT No.: PCT/JP2014/002970
§ 371 (c)(1),
(2) Date: Feb. 10, 2015

(87) PCT Pub. No.: WO2014/199596
PCT Pub. Date: Dec. 18, 2014

(65) Prior Publication Data
US 2015/0205568 A1 Jul. 23, 2015

(30) Foreign Application Priority Data
Jun. 10, 2013 (JP) ................. 2013-121714

(51) Int. Cl.
*G06F 3/16* (2006.01)
*G10L 15/00* (2013.01)
(Continued)

(52) U.S. Cl.
CPC ............. *G06F 3/16* (2013.01); *G10L 15/00* (2013.01); *G10L 15/22* (2013.01); *G10L 15/24* (2013.01);
(Continued)

(58) Field of Classification Search
CPC ..................................................... G10L 17/22
See application file for complete search history.

(56) References Cited

U.S. PATENT DOCUMENTS 6,882,971 B2 * 4/2005 Craner .................. H04M 1/247
704/246
7,117,157 B1 * 10/2006 Taylor .................... G06F 3/012
704/246
(Continued)

FOREIGN PATENT DOCUMENTS

JP 10-198393 7/1998
JP 2001-314649 11/2001
(Continued)

OTHER PUBLICATIONS

International Search Report issued Sep. 16, 2014 in International (PCT) Application No. PCT/JP2014/002970.

*Primary Examiner* — Brian Albertalli
(74) *Attorney, Agent, or Firm* — Wenderoth, Lind & Ponack, L.L.P.

(57) ABSTRACT

The present disclosure is a speaker identification method in a speaker identification system. The system stores registered voice signals and speaker images, the registered voice signals being respectively generated based on voices of speakers, the speaker images being respectively associated with the registered voice signals and respectively representing the speakers. The method includes: acquiring voice of a speaker positioned around a display; generating a speaker voice signal from the voice of the speaker; identifying a registered voice signal corresponding to the speaker voice signal, from the stored registered voice signals; and displaying the speaker image, which is associated with the identified registered voice signal, on the display, at least while the
(Continued)

voice of the speaker which forms a basis of generation of the speaker voice signal is being acquired.

8 Claims, 26 Drawing Sheets

(51) Int. Cl.
    *G10L 15/22*     (2006.01)
    *G10L 17/00*     (2013.01)
    *G10L 15/24*     (2013.01)
    *G10L 17/22*     (2013.01)
    *G10L 15/25*     (2013.01)

(52) U.S. Cl.
    CPC .............. *G10L 17/00* (2013.01); *G10L 17/22* (2013.01); *G10L 15/25* (2013.01)

(56) References Cited

U.S. PATENT DOCUMENTS

| | | | | |
|---|---|---|---|---|
| 8,243,902 B2* | 8/2012 | Caspi | ............... | H04M 3/385 379/142.05 |
| 8,315,366 B2* | 11/2012 | Basart | ............... | H04M 15/06 379/142.01 |
| 9,196,253 B2* | 11/2015 | Nishiyama | ............... | G10L 17/02 |
| 9,223,340 B2* | 12/2015 | Locker | ............... | G06F 1/1605 |
| 2003/0177008 A1* | 9/2003 | Chang | ............... | G10L 17/26 704/255 |
| 2006/0136224 A1* | 6/2006 | Eaton | ............... | G10L 21/028 704/277 |
| 2008/0312923 A1* | 12/2008 | Crinon | ............... | H04M 3/569 704/246 |
| 2009/0037826 A1* | 2/2009 | Bennetts | ............... | H04N 7/15 715/753 |
| 2009/0094029 A1* | 4/2009 | Koch | ............... | H04M 3/42221 704/246 |
| 2009/0220065 A1* | 9/2009 | Ahuja | ............... | H04M 3/569 379/202.01 |
| 2009/0264085 A1 | 10/2009 | Aoike | | |
| 2009/0282103 A1* | 11/2009 | Thakkar | ............... | H04N 7/147 709/204 |
| 2011/0093266 A1* | 4/2011 | Tham | ............... | G10L 17/04 704/246 |
| 2011/0161076 A1 | 6/2011 | Davis et al. | | |
| 2011/0244919 A1 | 10/2011 | Aller et al. | | |
| 2012/0008875 A1* | 1/2012 | Martensson | ............... | G10L 17/26 382/305 |
| 2012/0154633 A1 | 6/2012 | Rodriguez | | |
| 2012/0316876 A1* | 12/2012 | Jang | ............... | G06F 3/167 704/246 |
| 2013/0041665 A1* | 2/2013 | Jang | ............... | H04N 21/42203 704/246 |
| 2013/0144623 A1* | 6/2013 | Lord | ............... | G09B 21/006 704/249 |
| 2013/0162752 A1* | 6/2013 | Herz | ............... | H04N 7/15 348/14.08 |
| 2014/0114664 A1* | 4/2014 | Khan | ............... | H04N 7/152 704/270 |
| 2014/0163982 A1* | 6/2014 | Daborn | ............... | G10L 15/26 704/235 |

FOREIGN PATENT DOCUMENTS

| | | |
|---|---|---|
| JP | 2001-339529 | 12/2001 |
| JP | 2002-341890 | 11/2002 |
| JP | 2004-56286 | 2/2004 |
| JP | 2010-219703 | 9/2010 |
| JP | 2011-34382 | 2/2011 |
| WO | 2007/058135 | 5/2007 |
| WO | 2011/116309 | 9/2011 |

* cited by examiner

FIG. 3

| REGISTERED VOICE SIGNAL | USER INFORMATION | | | REGISTRATION ICON |
|---|---|---|---|---|
| | AGE | GENDER | NICKNAME | |
| 0001.wav | QUADRAGENARIAN | MALE | PAPA | A01 |
| 0002.wav | THIRTIES | FEMALE | MAMA | — |
| 0003.wav | SECOND DECADE | FEMALE | AA-CHAN | B05 |

| REGISTERED VOICE SIGNAL | VOICE DATA |
|---|---|
| 0001.wav | PROGRAM CHART, CHANNEL 8 |
| 0002.wav | LET'S MAKE DINNER WHILE WATCHING COOKERY PROGRAM |
| 0003.wav | WHAT'S BASEBALL RESULT FROM SPORTS PROGRAM? |

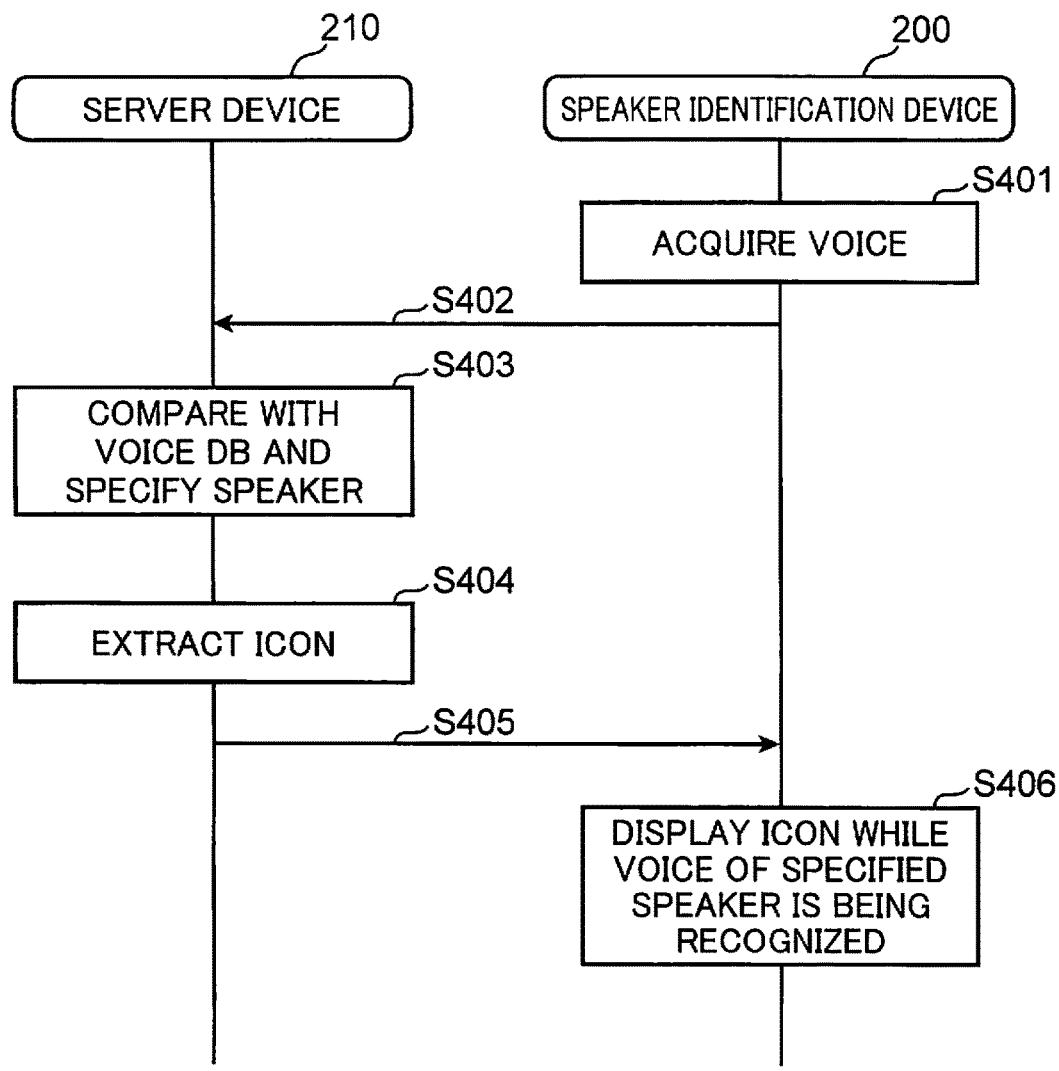

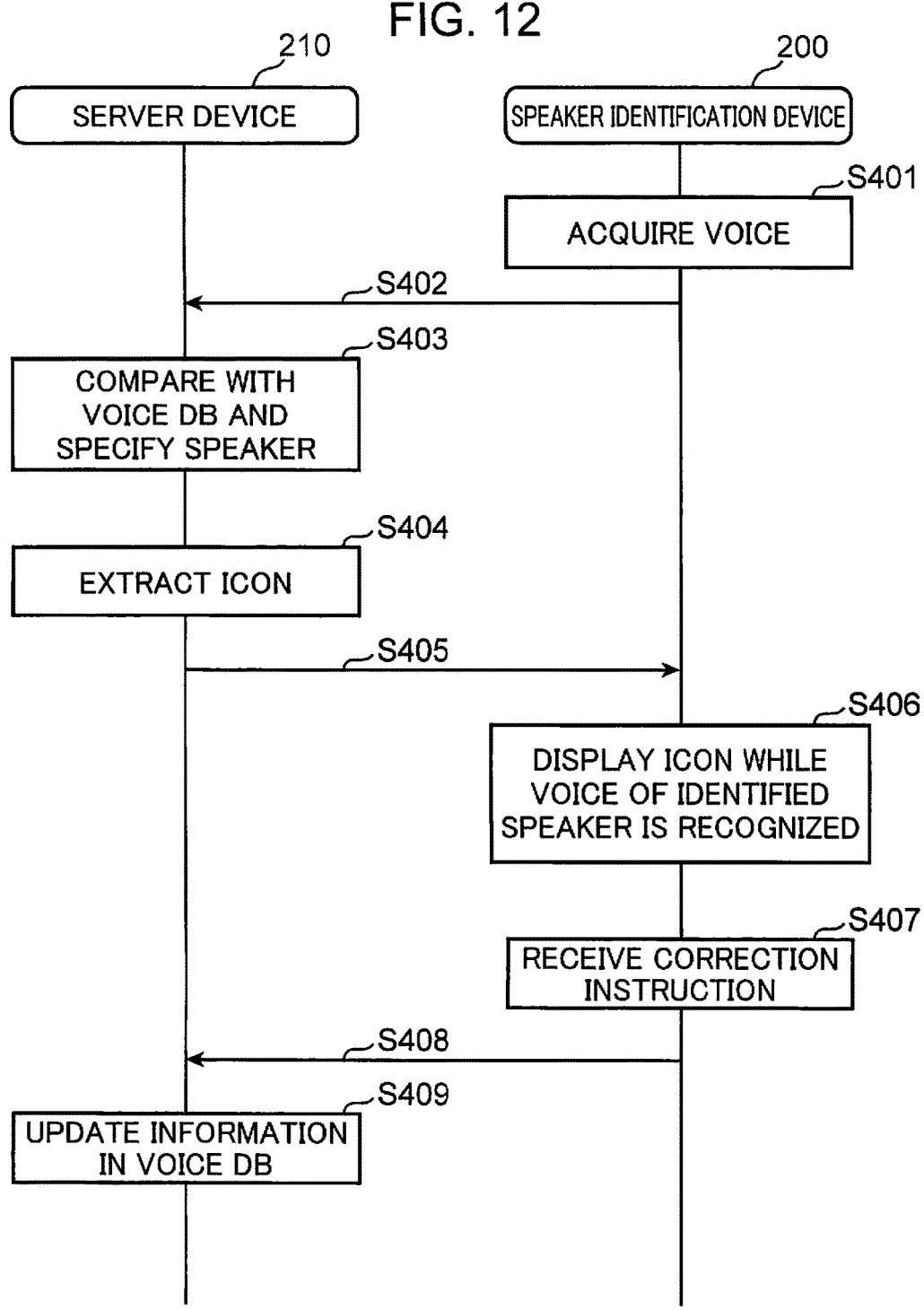

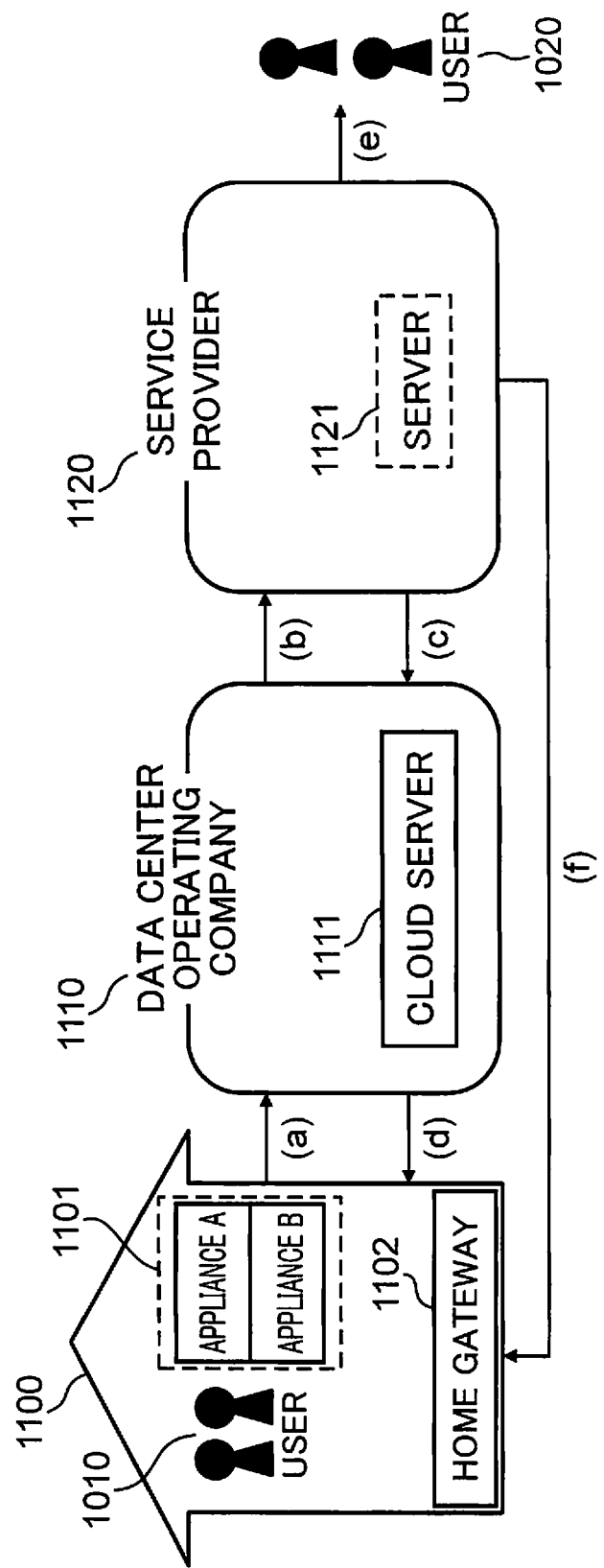

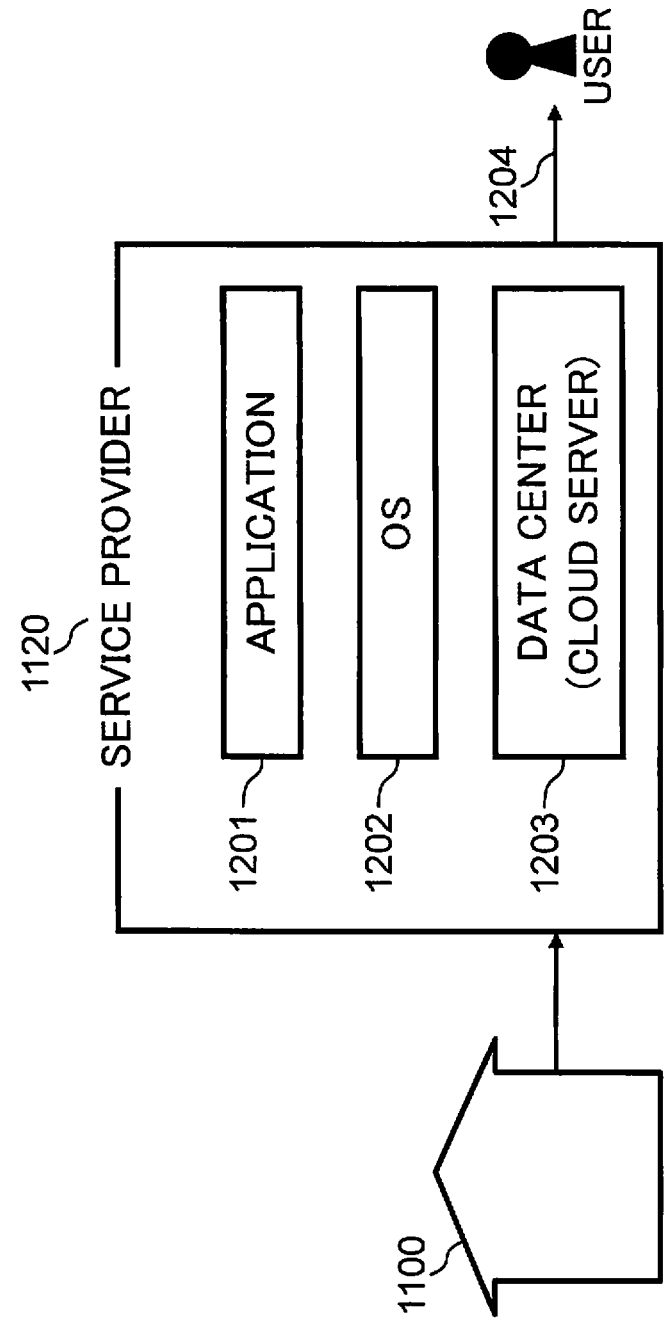

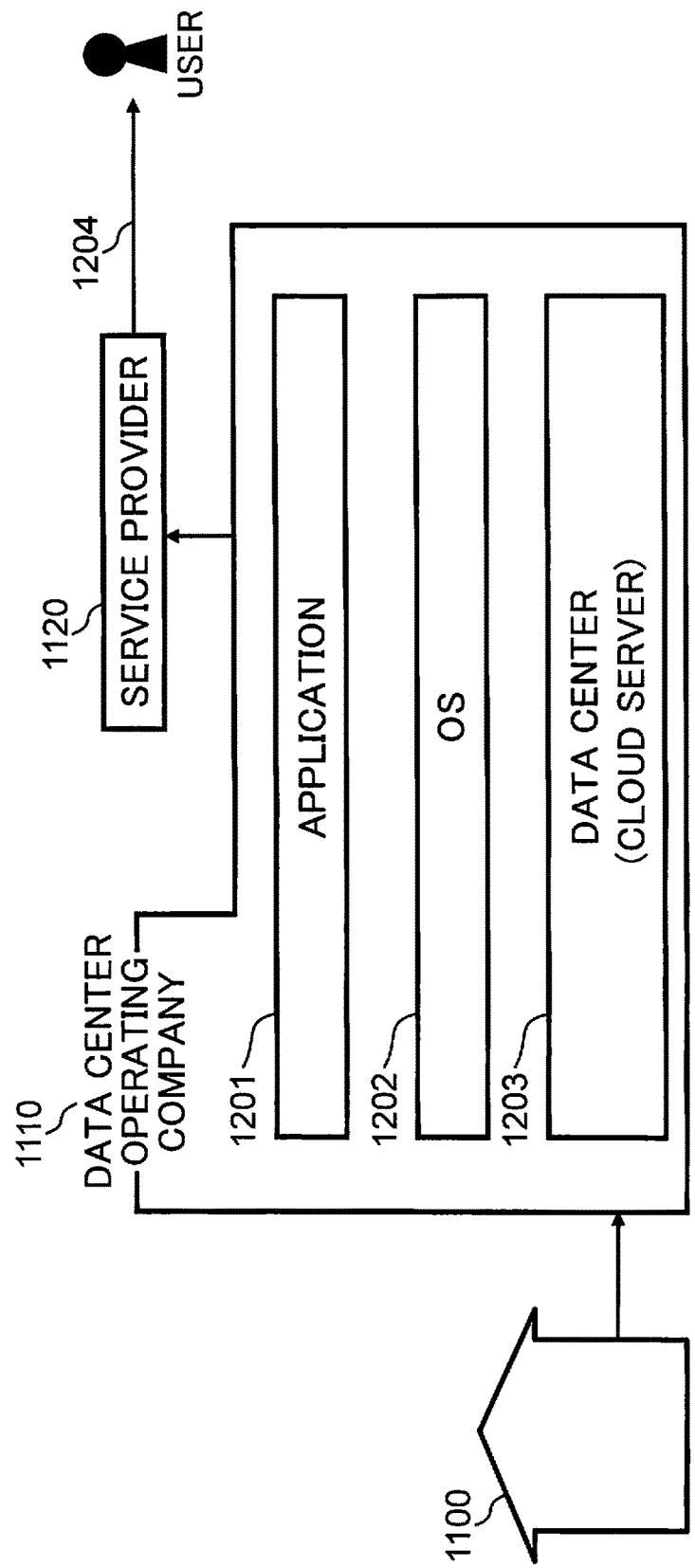

SPEAKER IDENTIFICATION METHOD, SPEAKER IDENTIFICATION DEVICE, AND SPEAKER IDENTIFICATION SYSTEM

TECHNICAL FIELD

The present disclosure relates to a speaker identification method, a speaker identification device and a speaker identification system, which identify a speaker to display a speaker image representing the identified speaker on a display.

BACKGROUND ART

Conventionally, a method has been proposed for identifying a speaker using information included in a voice signal, as a speaker identification and voice recognition device. Patent Document 1 discloses a method wherein, when the contents of a conversation are recorded as text data by voice recognition, the voice feature extracted from the voice and a time stamp are also recorded for each word, and words spoken by the same speaker are displayed by being classified by color and/or display position. Thereby, a conference system capable of identifying respective speakers is achieved.

Furthermore, Patent Document 2 discloses a display method wherein voice data is converted into text image data, and a text string which moves in accordance with the succession of voice is displayed. Therefore, a display method is achieved by which information can be understood on multiple levels, by the image and text.

However, in the conventional composition, further improvements have been necessary.

CITATION LIST

Patent Document

Patent Document 1: Japanese Unexamined Patent Publication No. H10-198393
Patent Document 2: Japanese Unexamined Patent Publication No. 2002-341890

SUMMARY OF INVENTION

In order to solve the above problem, an aspect of the present disclosure is
a speaker identification method in a speaker identification system which identifies voice of a speaker positioned around a display to display a result of the identification on the display,
the speaker identification system including a database which stores registered voice signals and speaker images, the registered voice signals being respectively generated based on voices of speakers, the speaker images being respectively associated with the registered voice signals and respectively representing the speakers, the method includes:
acquiring voice of a speaker positioned around the display;
generating a speaker voice signal from the acquired voice of the speaker;
identifying a registered voice signal corresponding to the generated speaker voice signal, from the registered voice signals stored in the database; and
displaying the speaker image, which is stored in the database and is associated with the identified registered voice signal, on the display, at least while the voice of the speaker which forms a basis of generation of the speaker voice signal is being acquired.

According to the present aspect, it is possible to achieve further improvements.

BRIEF DESCRIPTION OF DRAWINGS

FIG. 3 is a diagram showing one example of voice information which is stored in a voice DB.

FIG. 4 is a diagram showing another example of voice information which is stored in a voice DB.

FIG. 7 is a sequence diagram showing one example of the operation of the speaker identification system in FIG. 6.

FIG. 12 is a sequence diagram showing one example of an operation in the speaker identification system in FIG. 6 according to the second embodiment.

FIG. 13A is a diagram showing an overview of the speaker identification system according to the embodiments.

FIG. 14 is a diagram illustrating a type of service according to the embodiments (own data center type).

FIG. 17 is a diagram illustrating a type of service according to the embodiments (SaaS use type).

Figure 1:
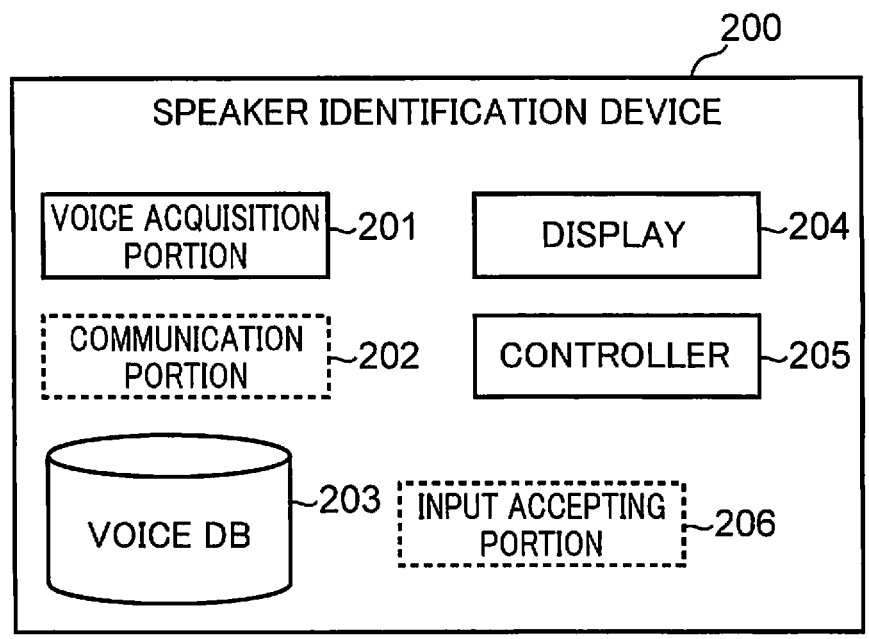
FIG. 1 is a block diagram showing a compositional example of a speaker identification device constituting a speaker identification system according to a first embodiment.

DESCRIPTION OF EMBODIMENTS (Findings Forming the Basis of the Present Disclosure)

A system has been investigated which provides a service to a user on the basis of acquired information relating to the circumstances of use of a domestic appliance, or voice information from the user who is using the appliance, or the like. However, the circumstances of use of the appliance or the voice information has an aspect for the user of being information similar to personal information. Therefore, if the circumstances of use of the appliance or the voice information which has been acquired is used directly without visualization, then it is not clear how the information being used has been acquired, and it is considered that a user will have resistance to this. Therefore, in order to reduce the resistance of the user, it is necessary to develop a system which displays the acquired information in a visualized form.

Moreover, in cases where there is erroneous detection in the information acquired by the appliance, if information based on erroneous detection is visualized, then this may cause further discomfort to the user. Consequently, it is desirable that, if there is erroneous detection while visualizing and displaying the acquired information, the information visualized on the basis of the erroneous detection can be corrected easily by an operation by the user.

Furthermore, specifically providing a dedicated display device which only displays the acquired information, as a device for displaying the information acquired from the user, is not desirable due to involving costs and requiring an installation space. Therefore, it has been considered that the information could be displayed on a display device not originally intended to display the results of acquired information, such as a television receiver (hereinafter, "TV") in a household, for instance. In the case of a display device such as a TV, it is necessary to display a received television broadcast image on the display screen. Therefore, it has been necessary to investigate methods for displaying the acquired information, apart from the television broadcast, on the display screen of the TV. Meanwhile, in order to reduce the resistance of the user described above, it is desirable that the voice recognition results can be confirmed straightforwardly and immediately.

Furthermore, there is a high probability of unspecified number of people being present around the TV, when acquired voice information is displayed on the display screen of the TV, for example. In the prior art, there has been no investigation of a system which is capable of displaying voice information for the people, in an immediate, clear and simple fashion, and even enabling correction of the information.

When the results of speaker identification and voice recognition are display as text, as in the technology disclosed in Patent Documents 1 and 2, in cases where people are conversing, or where a speaker speaks a plurality of times consecutively, the display image of the text string becomes complicated and it is difficult to tell clearly who is being identified and displayed. Furthermore, in the rare cases where an erroneous speaker identification result is displayed, there is a problem in that no simple method of correction exists.

Furthermore, in the technology disclosed in Patent Documents 1 and 2, sufficient investigation has not been made into display methods for displaying the results of voice recognition on a display device which is not originally intended for displaying the results of voice recognition, such as a TV, for example.

The technology according to Patent Document 1, for example, is a conversation recording device which simply records the contents of a meeting for instance, wherein time stamps and feature amounts extracted from voice are also recorded for each text character, a clustering process is carried out after recording, the number of people participating in a conversation and voice feature of each speaker are determined, a speaker is identified by comparing the voice feature of the speaker with recorded data, and the contents spoken by the same speaker are displayed so as to be classified by color and/or display position. Therefore, it is thought that, with the technology disclosed in Patent Document 1, it would be difficult to confirm the display contents in a simple and accurate manner, and to correct the contents, in cases where speakers have spoken. Furthermore, although Patent Document 1 indicates an example in which acquired voice information is displayed, only an example in which the voice information is displayed on the whole screen is given. Therefore, in the technology disclosed in Patent Document 1, there is not even any acknowledgement of a problem relating to the displaying of voice information on a display device which is not originally intended to display the results of voice recognition.

Furthermore, the technology according to Patent Document 2 relates to a voice recognition and text display device by which both language information and voice feature information contained in a voice signal can be understood rapidly and simply. This technology discloses a display method for simply converting information into text image data, and a text string which moves in accordance with the succession of voice is displayed. Since the technology disclosed in Patent Document 2 achieves a display method by which information can be understood on multiple levels, by image and text, it is thought that it would be difficult to make changes easily, if there is an error in the display.

The present disclosure resolves the problems of conventional voice recognition devices such as those described above. By means of one aspect of the present disclosure, a device is provided whereby voice information of speakers is acquired and the acquired voice information can be displayed immediately, in a clear and simple fashion, on a display device such as a TV, for example, while also displaying the contents that are originally to be displayed thereon. Moreover, according to one aspect of the present disclosure, a device is provided whereby, when there is an erroneous detection in the acquired information, for instance, then the user is able to correct the displayed information in a simple manner.

An aspect of the present disclosure is a speaker identification method in a speaker identification system which identifies voice of a speaker positioned around a display to display a result of the identification on the display, the speaker identification system including a database which stores registered voice signals and speaker images, the registered voice signals being respectively generated based on voices of speakers, the speaker images being respectively associated with the registered voice signals and respectively representing the speakers, the method includes:

acquiring voice of a speaker positioned around the display;

generating a speaker voice signal from the acquired voice of the speaker;

identifying a registered voice signal corresponding to the generated speaker voice signal, from the registered voice signals stored in the database; and displaying the speaker image, which is stored in the database and is associated with the identified registered voice signal, on the display, at least while the voice of the speaker which forms a basis of generation of the speaker voice signal is being acquired.

According to the present aspect, a speaker image representing a speaker is displayed on the display, and therefore it is possible to display the result of the identification of the speaker clearly to the user. Furthermore, the speaker image is displayed on the display at least while the voice of the speaker which forms a basis of generation of the speaker voice signal is being acquired. Therefore, it is possible to prevent excessive obstruction of the display of the contents that are originally to be displayed by the display (for example, in a case where the display is the display screen of a television receiver, a television broadcast program).

In the aspect described above, for example, the speaker image being displayed may be erased from the display, when a prescribed time period has elapsed from the time at which the voice of the speaker which forms a basis of generation of the speaker voice signal ceases to be acquired.

According to the present aspect, the speaker image being displayed is erased from the display, when a prescribed time period has elapsed from the time at which the voice of the speaker which forms a basis of generation of the speaker voice signal ceases to be acquired. Consequently, excessive obstruction of the display of the contents which are originally intended for display by the display is prevented.

In the aspect described above, for example, the database may store, as the registered voice signals, a first registered voice signal generated based on a voice of a first speaker, and a second registered voice signal generated based on a voice of a second speaker, and may store a first speaker image which represents the first speaker and is associated with the first registered voice signal, and a second speaker image which represents the second speaker and is associated with the second registered voice signal, a first speaker voice signal may be generated when voice of the first speaker is acquired, when the generated first speaker voice signal is identified as corresponding to the first registered voice signal, the first speaker image may be displayed on the display, at least while the voice of the first speaker is being acquired, when voice of the second speaker is acquired while the first speaker image is displayed on the display, a second speaker voice signal may be generated, and when the generated second speaker voice signal is identified as corresponding to the second registered voice signal, the second speaker image may be displayed on the display in addition to the first speaker image, at least while the voice of the second speaker is being acquired.

According to the present aspect, the first speaker image is displayed on the display, at least while the voice of the first speaker is being acquired, and the second speaker image is displayed on the display, at least while the voice of the second speaker is being acquired. Consequently, it is possible to confirm the current speaker, by the speaker image displayed on the display.

In the aspect described above, for example, the first speaker image and the second speaker image may be displayed alongside each other on the display, in an order of acquisition of the voice of the first speaker and the voice of the second speaker.

According to the present aspect, the arrangement order of the first speaker image and the second speaker image displayed on the display is changed, when the speaker is switched between the first speaker and the second speaker. As a result of this, the speakers are prompted to speak.

In the aspect described above, for example, of the first speaker image and the second speaker image, the speaker image which has been registered later in the database may be displayed on the display in a different mode from the speaker image which has been registered earlier in the database.

According to the present aspect, of the first speaker image and the second speaker image, the speaker image which has been registered later in the database is displayed on the display in a different mode from the speaker image which has been registered earlier in the database. Therefore, it is possible readily to confirm the speaker who has spoken later.

In the aspect described above, for example, the number of speaking actions by the first speaker and the number of speaking actions by the second speaker may be counted, and the first speaker image and the second speaker image may be displayed alongside each other on the display, in order from the highest number of speaking actions thus counted.

According to the present aspect, the first speaker image and the second speaker image are displayed alongside each other on the display in order from the highest number of speaking actions. Therefore, the first speaker and the second speaker are prompted to speak.

For example, the aspect described above may further includes:

when a correction instruction from a speaker in relation to the speaker image is received, newly acquiring voice of the speaker who has instructed the correction;

newly generating a speaker voice signal from the newly acquired voice of the speaker, and overwriting the registered voice signal, which is stored in the database and is associated with the speaker image for which the correction instruction has been made, with the newly generated speaker voice signal.

According to the present aspect, when a correction instruction from a speaker in relation to the speaker image is received, the registered voice signal stored in the database and associated with the speaker image for which the correction instruction has been made is overwritten with the newly generated speaker voice signal. As a result of this, correction can be carried out easily, even when an erroneous speaker image is displayed on the display due to the registered voice signal being erroneous.

In the aspect described above, for example, the correction instruction from the speaker may be received in respect of the speaker image which is being displayed on the display and may not be received in respect of the speaker image which is not being displayed on the display.

According to the present aspect, the correction instruction from the speaker is not received in respect of the speaker image which is not being displayed on the display. Therefore it is possible to avoid situations in which an erroneous correction instruction is received from a speaker, for instance.

For example, the aspect described above may further includes:

judging an attribute of the speaker from the generated speaker voice signal, creating the speaker image based on the judged attribute of the speaker, and storing the generated speaker voice signal, the judged attribute of the speaker and the created speaker image in the database while being associated with one another, the generated speaker voice signal being stored in the database as the registered voice signal.

According to the present aspect, when voice of a speaker is acquired, the registered voice signal, the attribute of the speaker and the speaker image are stored in the database while being associated with one another. Therefore, it is possible to reduce the number of operation required for registration by the user. The attribute of the speaker may be the gender of the speaker, for example. The attribute of the speaker may be approximate age of the speaker, for example.

Another aspect of the present disclosure is
a speaker identification device, including:
a display;
a voice acquisition portion which acquires voice of a speaker positioned around the display;
a voice processor which generates a speaker voice signal from the acquired voice of the speaker;
a database which stores registered voice signals and speaker images, the registered voice signals being respectively generated based on voices of speakers, the speaker images being respectively associated with the registered voice signals and respectively representing the speakers;
an identification processor which identifies a registered voice signal corresponding to the generated speaker voice signal, from the registered voice signals stored in the database; and
a display controller which displays the speaker image, which is stored in the database and is associated with the identified registered voice signal, on the display, at least while the voice acquisition portion is acquiring the voice of the speaker which forms a basis of generation of the speaker voice signal.

According to the present aspect, a speaker image representing a speaker is displayed on the display, and therefore it is possible to display the result of the identification of the speaker clearly to the user. Furthermore, the speaker image is displayed on the display at least while the voice of the speaker which forms a basis of generation of the speaker voice signal is being acquired. Therefore, it is possible to prevent excessive obstruction of the display of the contents that are originally to be displayed by the display (for example, in a case where the display is the display screen of a television receiver, a television broadcast program).

Still another aspect of the present disclosure is
a speaker identification device, including:
a display;
a voice acquisition portion which acquires voice of a speaker positioned around the display;
a voice processor which generates a speaker voice signal from the acquired voice of the speaker;
a communication portion which communicates with an external server device via a network; and
a display controller which controls the display, wherein
the communication portion sends the generated speaker voice signal to the server device, and receives a speaker image representing the speaker identified based on the speaker voice signal from the server device, and
the display controller displays the received speaker image on the display, at least while the voice acquisition portion is acquiring the voice of the speaker which forms a basis of generation of the speaker voice signal.

According to the present aspect, a speaker image representing a speaker is identified based on the speaker voice signal, in the server device. The speaker image is received from the server device by the communication portion. The received speaker image is displayed on the display. Therefore, the result of speaker identification can be displayed clearly to the user. Furthermore, the speaker image is displayed on the display at least while the voice of the speaker which forms a basis of generation of the speaker voice signal is being acquired. Therefore, it is possible to prevent excessive obstruction of the display of the contents which are originally to be displayed by the display (for example, in a case where the display is the display screen of a television receiver, a television broadcast program).

Still another aspect of the present disclosure is
a speaker identification system, including:
a voice acquisition portion which acquires voice of a speaker positioned around a display;
a voice processor which generates a speaker voice signal from the acquired voice of the speaker;
a storage which stores registered voice signals and speaker images, the registered voice signals being respectively generated based on voices of speakers, the speaker images being respectively associated with the registered voice signals and respectively representing the speakers;
an identification processor which identifies a registered voice signal corresponding to the generated speaker voice signal, from the registered voice signals; and
a display controller which displays the speaker image, which is stored in the storage and is associated with the identified registered voice signal, on the display, at least while the voice acquisition portion is acquiring the voice of the speaker which forms a basis of generation of the speaker voice signal.

According to the present aspect, a speaker image representing a speaker is displayed on the display, and therefore it is possible to display the result of the identification of the speaker clearly to the user. Furthermore, the speaker image is displayed on the display at least while the voice of the speaker which forms a basis of generation of the speaker voice signal is being acquired. Therefore, it is possible to prevent excessive obstruction of the display of the contents which are originally to be displayed by the display (for example, a television broadcast program in a case where the display is the display screen of a television receiver).

Embodiments are described below with reference to the drawings.

All of the embodiments described below show one concrete example of the present disclosure. The numerical values, shapes, constituent elements, steps, order of steps, and the like, shown in the following embodiments are examples and are not intended to limit the present disclosure. Furthermore, of the constituent elements of the following embodiment, constituent elements which are not described in independent claims representing a highest-level concept are described as desired constituent elements. Furthermore, the respective contents of all of the embodiments can be combined with each other.

First Embodiment

Figure 2:
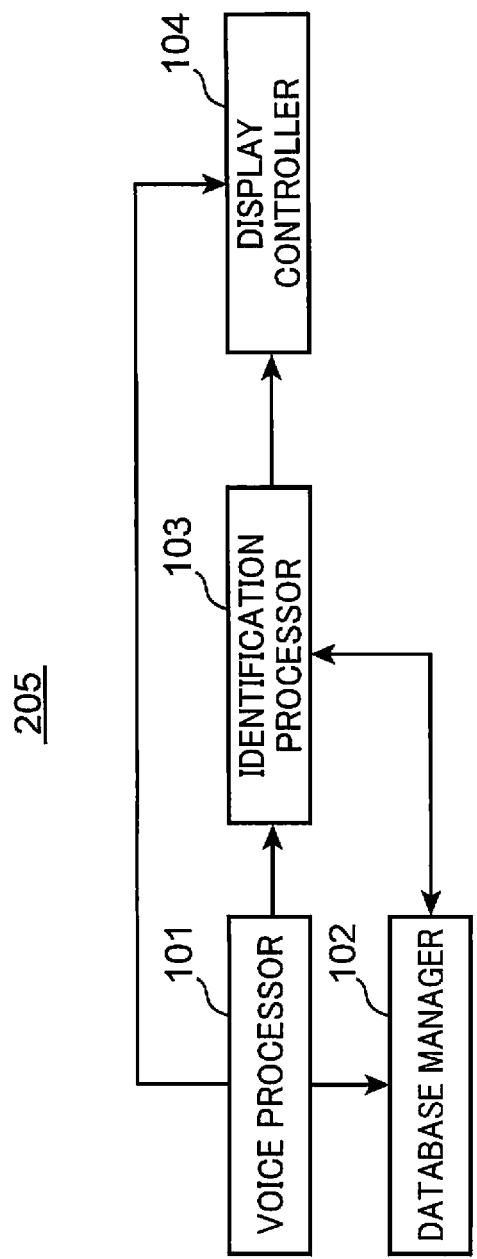
FIG. 2 is a block diagram showing functions of a controller of the speaker identification device illustrated in FIG. 1.

FIG. 1 is a block diagram showing a compositional example of a speaker identification device 200 constituting a speaker identification system according to a first embodiment. FIG. 2 is a block diagram showing functions of a controller 205 of the speaker identification device 200 illustrated in FIG. 1.

As shown in FIG. 1, the speaker identification device 200 includes a voice acquisition portion 201, a voice database (DB) 203, a display 204, and a controller 205. Furthermore, the speaker identification device 200 may also include a communication portion 202 and an input accepting portion 206. As shown in FIG. 2, the controller 205 of the speaker identification device 200 includes a voice processor 101, a database manager 102, an identification processor 103, and a display controller 104.

Here, the speaker identification device 200 may be a general domestic TV, or a monitor of a personal computer (PC), for example. Here, as described in the "findings forming the basis of the present disclosure" given above in particular, the speaker identification device 200 is envisaged to be a device which is capable of displaying other contents and the like, rather than a dedicated display device which only displays the speaker identification results. However, any device may be employed, provided that the respective components described above are provided in a device having a display function.

Furthermore, the respective components do not necessarily have to be arranged inside the frame of the speaker identification device 200. For example, even if the voice acquisition portion 201 is connected to the outside of the frame of the speaker identification device 200, that voice acquisition portion 201 is still included in the speaker identification device 200. The speaker identification device 200 is not limited to being arranged as one device per household, and may be arranged as devices per household. In this first embodiment, the speaker identification device 200 is a general domestic TV.

The voice acquisition portion 201 is a microphone, for example. The voice acquisition portion 201 acquires voice spoken by a viewer who is watching the speaker identification device 200. Here, the voice acquisition portion 201 may be provided with an instrument which controls directionality. In this case, by imparting directionality in the direction in which the viewer is present, it is possible to improve the accuracy of acquisition of the voice that is spoken by the viewer. Furthermore, it is also possible to detect the direction in which the speaker is positioned.

Furthermore, the voice acquisition portion 201 may have a function for not acquiring (or removing) sounds other than the voice of a human speaking. If the speaker identification device 200 is a TV, for example, as shown in the first embodiment, then the voice acquisition portion 201 may have a function for removing the voice signal of the TV from the acquired voice. By this means, it is possible to improve the accuracy of acquisition of the voice spoken by a viewer.

The voice DB 203 is composed by a recording medium or the like, which can store (record) information. The voice DB 203 does not have to be provided inside the frame of the speaker identification device 200. Even if the voice DB 203 is composed by an externally installed recording medium, or the like, for example, or is connected to the outside of the frame of the speaker identification device 200, the voice DB 203 is still included in the speaker identification device 200.

The voice DB 203 is used to store and manage voice of the family owning the speaker identification device 200, operating sounds of the family or voice other than voice of the family, and also age and gender information, etc., about the members of the family (users). There are no particular restrictions on the details of the information stored in the voice DB 203, provided that information is stored which enables the user to be specified from voice around the speaker identification device 200 acquired by the voice acquisition portion 201.

In this first embodiment, for example, registered voice signals (information generated from the spectra, frequencies, or the like of voice signals) and user information (information such as age, gender and nickname) are stored in the voice DB 203 while being associated with each other. Furthermore, in this first embodiment, a speaker image corresponding to each user is stored in the voice DB 203 while being associated with one another.

FIG. 3 is a diagram showing one example of voice information 800 which is stored in the voice DB 203. The voice information 800 includes a registered voice signal 801, user information 802, and a registration icon 803 (one example of a speaker image), which are associated with one another.

In FIG. 3, the registered voice signal 801 is a signal representing a feature vector having a predetermined number of dimensions which is generated based on information such as the spectrum or frequency of the voice signal. In this first embodiment, the registered voice signal 801 is registered as a file in ".wav" format. The registered voice signal 801 does not have to be a file in ".wav" format. For example, the registered voice signal 801 may be generated as compressed audio data, such as MPEG-1 Audio Layer 3, Audio Interchange File Format, or the like. Furthermore, the registered voice signal 801 may be encoded automatically in a compressed file and then stored in the voice DB 203, for example.

The user information 802 is information representing an attribute of the user (speaker). In this first embodiment, as shown in FIG. 3, the user information 802 includes, as the attributes of the user, the "age", "gender" and "nickname". In the example of the user information 802 in FIG. 3, an "age" is set to "40s", a "gender" is set to "male", and a "nickname" is set to "papa", which are associated with the user whose registered voice signal 801 is "0001.wav". The "age" and "gender" may be registered automatically by the database manager 102 and the like, or may be registered by the user using the input accepting portion 206. The "nickname" may be registered by the user using the input accepting portion 206.

Figure 8A:
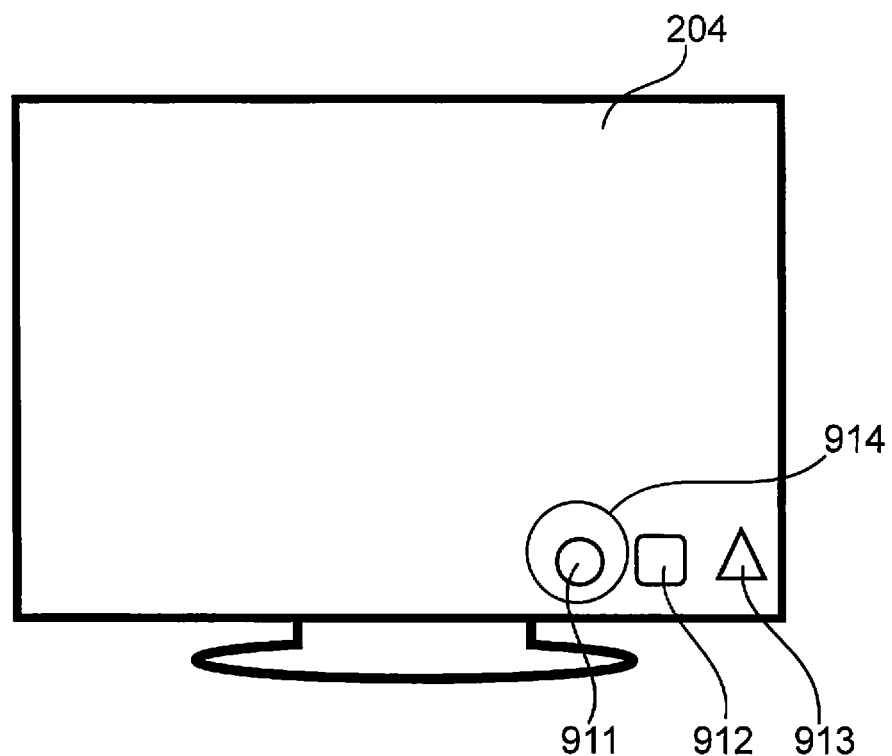
FIG. 8A is a diagram showing a concrete display example of a registration icon which is displayed on the display, in the speaker identification system in FIG. 1 or FIG. 6.
Figure 8B:
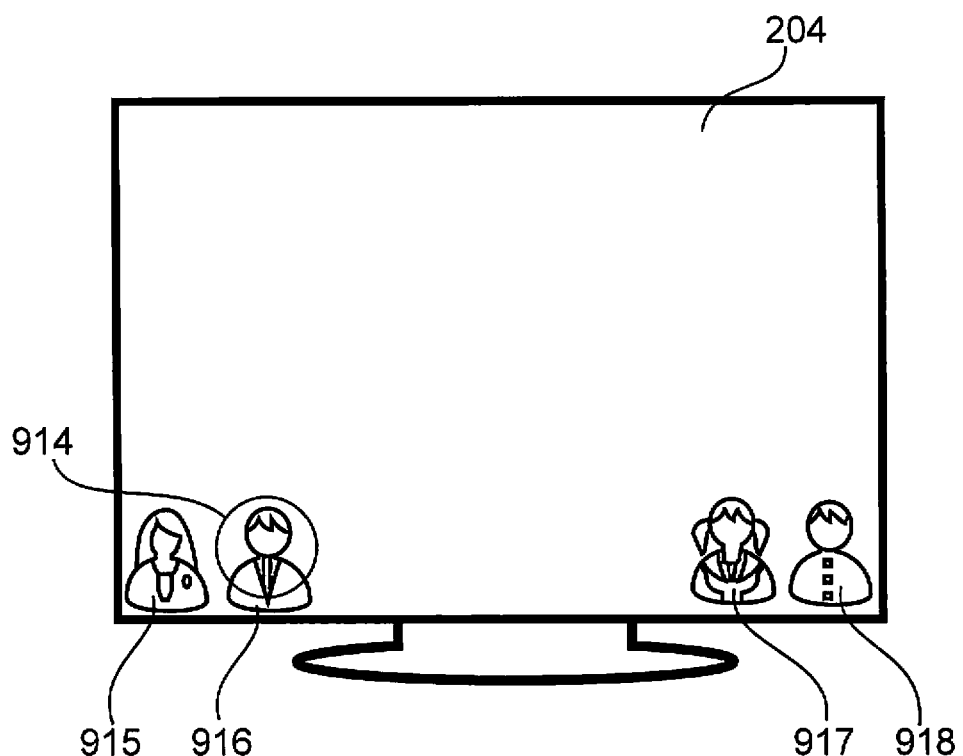
FIG. 8B is a diagram showing a concrete display example of a registration icon which is displayed on the display, in the speaker identification system in FIG. 1 or FIG. 6.

The registration icon 803 is a speaker image which represents the user (speaker). In the example of the registration icon 803 in FIG. 3, the "icon A01" is set in association with the user whose registered voice signal 801 is "0001.wav", and the "icon B05" is set in association with the user whose registered voice signal 801 is "0003.wav". The registration icon 803 may be an icon which is a symbol of a circular, square or triangular shape, as shown in FIG. 8A described below. Alternatively, the registration icon 803 may be an icon which shows a schematic representation of a human face, as shown in FIG. 8B described below.

With regard to the registration icon 803, the controller 205 may register an icon selected by the user from among icons created in advance, or may register an image created by the user personally as a registration icon 803, in the voice information 800. Furthermore, even in a case where an icon has not been registered in the voice information 800 by the user, the controller 205 may select, or create, an icon matching the user information 802, on the basis of the user information 802, and may register the icon in the voice information 800.

There are no particular restrictions on the method for constructing the voice information 800 which is stored in the voice DB 203. For example, it is possible to construct the voice information 800 by initial registration by the user in advance. For instance, in the initial registration, the voice acquisition portion 201 acquires voice each time a user situated in front of the speaker identification device 200 speaks. The voice processor 101 generates a feature vector from the acquired voice of the speaker, and generates a speaker voice signal which represents the generated feature vector. The database manager 102 automatically registers the generated speaker voice signal as a registered voice signal 801 in the voice information 800 in the voice DB 203. In this way, the voice DB 203 may be completed.

Furthermore, in the initial registration, the input accepting portion 206 may display a user interface on the display 204, whereby the user can input user information 802 when speaking. The database manager 102 may update the voice information 800 in the voice DB 203 using the contents of the user information 802 input to the input accepting portion 206 by the user.

Even if the voice information 800 is not registered previously in the voice DB 203 by initial registration as described above, it is still possible to identify information about the speaker, to a certain degree. In general, the basic frequency of the voice of a speaker is known to vary depending on the age and gender. For example, it is said that the average basic frequency of the voice of a man speaking is 150 Hz to 550 Hz, and that the average basic frequency of the voice of a woman speaking is 400 Hz to 700 Hz. Therefore, instead of initial registration, the identification processor 103 of the speaker identification device 200 may also determine the age and gender, to a certain degree, on the basis of information such as the frequency of the signal representing the voice generated by the voice processor 101. The database manager 102 may register the registered voice signal 801 and the user information 802 in the voice information 800 of the voice DB 203, automatically, on the basis of the determination results of the identification processor 103.

Furthermore, the user information 802 is not limited to that illustrated in FIG. 3. The controller 205 may store preference information, such as a program having a frequent viewing history, for each user, as the user information 802, in the voice DB 203. Furthermore, there are no restrictions on the method for acquiring the user information 802. The user may make initial settings of the user information 802 using the input accepting portion 206 when using the speaker identification device 200 for the first time. Alternatively, the user may register the user information 802 using the input accepting portion 206 at the time that the user's voice is acquired.

FIG. 4 is a diagram showing another example of voice information 810 which is stored in the voice DB 203. The voice information 810 shown in FIG. 4 includes registered voice signals 801 and voice data 804 which are associated with each other. The voice data 804 is data which represents the spoken contents generated by the voice processor 101 from the voice of the speaker acquired by the voice acquisition portion 201. The voice information 810 such as that shown in FIG. 4 may become stored in the voice DB 203.

In this case, the voice processor 101 generates data representing the spoken contents in addition to a speaker voice signal representing the feature vector of the voice of the speaker. The voice processor 101 generates data representing the spoken contents, by voice recognition technology using an acoustic model and a language model, for example. The database manager 102 stores data representing the spoken contents generated by the voice processor 101, as voice data 804, in the voice DB 203.

The identification processor 103 further compares the data representing the spoken contents output from the voice processor 101, and the voice data 804 (spoken contents) stored in the voice DB 203. By this means, it is possible to improve the accuracy of specifying the speaker.

In the example in FIG. 4, it is registered that the user whose registered voice signal 801 is "0002.wav" has said "let's make dinner while watching the cookery program", at a certain timing. Therefore, when the speaker corresponding to the registered voice signal 801 being "0002.wav" says similar words, such as "cookery program", for example, at a separate timing, the identification processor 103 can judge that there is a high probability that the words have been spoken by the speaker corresponding to the registered voice signal 801 being "0002.wav".

Returning to FIG. 1, there are no particular limitations on the display 204, which may be a general monitor, or the like. In the first embodiment, the display 204 is a display screen, such as a TV. The display 204 is controlled by the display controller 104 of the controller 205 and displays images or information. In the speaker identification system according to the first embodiment, the display 204 displays a registration icon 803 associated with acquired voice of the speaker. Thereby, the user is able to tell clearly who is identified, or whether people are identified, by means of the speaker identification display system.

Furthermore, the speaker identification system according to the second embodiment which is described below is composed in such a manner that if an erroneous registration icon 803 is displayed due to the speaker identification being erroneous, for instance, when there are users around the speaker identification device 200, then correction can be made simply. Concrete examples of the registration icon 803 and the like, displayed on the display 204 are described below with reference to FIGS. 8A to 8F.

The controller 205 includes, for example, a CPU or microcomputer, and a memory, and the like. The controller 205 controls the operations of various components, such as the voice acquisition portion 201, the voice DB 203 and the display 204, and the like. For example, by means of the CPU or the microcomputer operating in accordance with a program stored in the memory, the controller 205 functions as the voice processor 101, the database manager 102, the identification processor 103 and the display controller 104 which are shown in FIG. 2. The respective functions of the controller 205 shown in FIG. 2 are described below with reference to FIG. 5.

Here, the speaker identification device 200 may be provided with the communication portion 202, as described above. The communication portion 202 communicates with other appliances and/or a server device, by connecting with the Internet or the like, and exchanges information with same.

Furthermore, the speaker identification device 200 may also include the input accepting portion 206. The input accepting portion 206 receives inputs from the user. There are no particular restrictions on the method of receiving inputs from the user. The input accepting portion 206 may be constituted by the remote controller of the TV. Alternatively, the input accepting portion 206 may display a user interface for operating the display 204. The user can input information or instructions by means of these input accepting portions 206.

Figure 5:
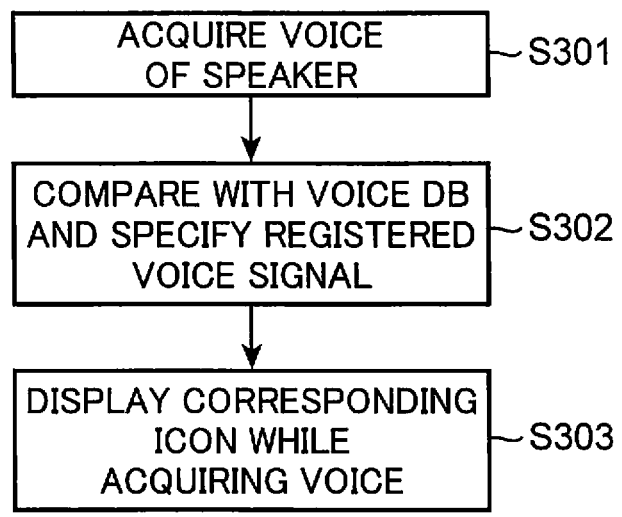
FIG. 5 is a flowchart showing processing in the speaker identification device which is illustrated in FIG. 1 of the speaker identification system according to the first embodiment.

FIG. 5 is a flowchart showing processing in the speaker identification device 200 which is illustrated in FIG. 1, of the speaker identification system according to the first embodiment.

Firstly, in step S301, the voice acquisition portion 201 acquires voice that has been spoken by the speaker. The voice processor 101 generates a feature vector of a predetermined number of dimensions, from the acquired voice of the speaker, and generates a speaker voice signal which represents the generated feature vector.

Consequently, in step S302, the database manager 102 extracts a registered voice signal 801 from the voice information 800 (FIG. 3) stored in the voice DB 203, and outputs the signal to the identification processor 103. The identification processor 103 specifies the registered voice signal 801 corresponding to the speaker voice signal, by comparing the speaker voice signal generated by the voice processor 101 with the registered voice signal 801 output from the database manager 102.

The identification processor 103 respectively calculates the similarities between the speaker voice signal and each of the registered voice signals 801 stored in the voice DB 203. The identification processor 103 extracts the highest similarity, of the calculated similarities. If the highest similarity is equal to or greater than a predetermined threshold value, then the identification processor 103 judges that the registered voice signal 801 corresponding to this highest similarity corresponds to the speaker voice signal. More specifically, for example, the identification processor 103 respectively calculates the distances between the feature vector of the speaker voice signal and the feature vectors of the registered voice signals 801. The identification processor 103 judges that the registered voice signal 801 having the shortest calculated distance has the highest similarity with the speaker voice signal.

Consequently, in step S303, the identification processor 103 outputs the specified registered voice signal 801 to the database manager 102. The database manager 102 refers to the voice information 800 stored in the voice DB 203 (FIG. 3) and extracts the registration icon 803 associated with the output registered voice signal 801. The database manager 102 outputs the extracted registration icon 803 to the identification processor 103.

The identification processor 103 outputs the output registration icon 803 to the display controller 104. The voice processor 101 outputs an acquisition signal indicating that voice by a speaker has been acquired by the voice acquisition portion 201, only while the voice is being acquired, to the display controller 104, for each respective speaker.

The display controller 104 displays the registration icon 803 output from the identification processor 103, on the display 204, while the acquisition signal is being input from the voice processor 101. The display controller 104 erases an icon which is being displayed on the display 204, when voice indicating a speaker specified from the voice of the speaker acquired by the voice acquisition portion 201 has ceased for a prescribed period of time, in other words, when a prescribed time (in the first embodiment, 10 seconds, for example) has elapsed without input of an acquisition signal of the specified speaker from the voice processor 101. In this case, the display controller 104 may gradually increase the transparency of the displayed icon such that the icon fades out from the display 204.

Figure 6:
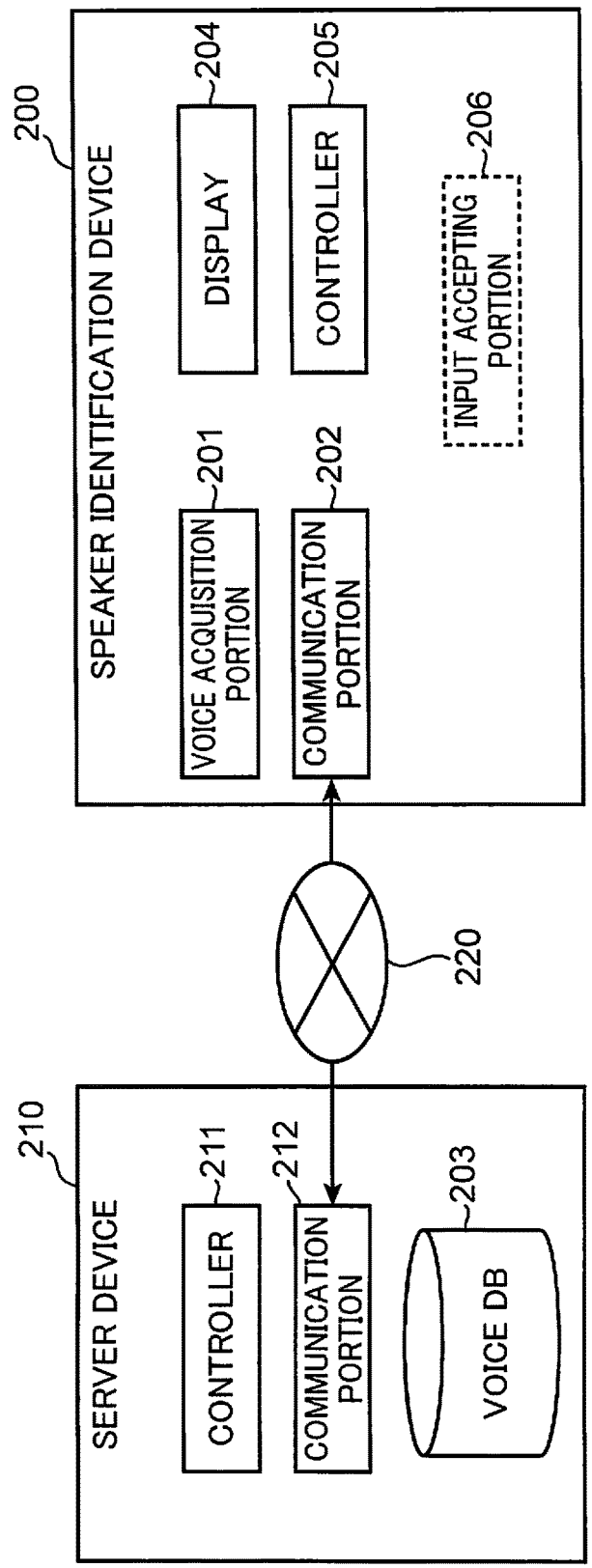
FIG. 6 is a block diagram showing another compositional example of a speaker identification system according to the first embodiment.

FIG. 6 is a block diagram showing another compositional example of a speaker identification system according to the first embodiment. In FIG. 6, elements which are the same as FIG. 1 are labelled with the same reference numerals. The speaker identification system in FIG. 6 is described below centering on the points of difference with respect to the speaker identification system in FIG. 1.

The speaker identification system in FIG. 6 is provided with a speaker identification device 200 and a server device 210. In the speaker identification system in FIG. 6, the voice DB 203 is included in the server device 210, in contrast to the speaker identification system in FIG. 1. In other words, the speaker identification device 200 is provided with a voice acquisition portion 201, a communication portion 202, a display 204, and a controller 205, and is not provided with a voice DB. In the speaker identification system in FIG. 6, as described above, the speaker identification device 200 may be a general domestic TV, or a monitor of a personal computer (PC), or the like. Similarly to FIG. 1, the speaker identification device 200 is a general domestic TV.

Furthermore, the server device 210 is provided with a controller 211, a communication portion 212 and a voice DB 203. There are no particular restrictions on the position where the server device 210 is located. The server device 210 may be disposed in a data center of a company which manages or runs a data center that handles "big data", or may be disposed in each household.

The communication portion 202 of the speaker identification device 200 communicates with the communication portion 212 of the server device 210, via a network 220 such as the Internet. Consequently, the controller 205 of the speaker identification device 200 can transmit the generated speaker voice signal, for example, to the server device 210 via the communication portion 202. The server device 210 may be connected to speaker identification devices 200 via the communication portion 212.

In the speaker identification system in FIG. 6, the respective functions shown in FIG. 2 may be included in either the controller 211 of the server device 210 or the controller 205 of the speaker identification device 200. For example, the voice processor 101 may be included in the controller 205 of the speaker identification device 200, in order to process the voice of the speaker acquired by the voice acquisition portion 201. The database manager 102, for instance, may be included in the controller 211 of the server device 210, in order to manage the voice DB 203. For example, the display controller 104 may be included in the controller 205 of the speaker identification device 200, in order to control the display 204.

The voice DB 203 may respectively store and manage voice information 800 (FIG. 3) corresponding to each of speaker identification devices 200, when the server device 210 is connected to the speaker identification devices 200.

FIG. 7 is a sequence diagram showing one example of the operation of the speaker identification system in FIG. 6. In FIG. 7, of the functions illustrated in FIG. 2, the database manager 102 and the identification processor 103 are included in the controller 211 of the server device 210, and the voice processor 101 and the display controller 104 are included in the controller 205 of the speaker identification device 200. Furthermore, here, an example of the operation of a speaker identification system which includes the server device 210 and the speaker identification device 200 shown in FIG. 6 is described, but this is merely an example and does not limit the present embodiment.

Firstly, in step S401, the voice acquisition portion 201 in the speaker identification device 200 acquires the voice of the speaker. The voice processor 101 extracts a feature amount from the acquired voice of the speaker, and generates a speaker voice signal which represents the extracted feature amount. Step S401 corresponds to step S301 shown in FIG. 5.

In step S401, there is no limit on the timing at which the voice processor 101 carries out processing such as feature amount extraction, and the like, on the voice of the speaker acquired by the voice acquisition portion 201. The voice acquisition portion 201 may acquire voice and the voice processor 101 may carry out processing such as feature amount extraction, etc., at all times while the power of the TV, which is the speaker identification device 200, is switched on. Furthermore, the voice processor 101 may start processing such as feature amount extraction, etc., of the voice acquired by the voice acquisition portion 201, from when the voice processor 101 detects a "magic word" (predetermined word). Moreover, the voice processor 101 may identify voice spoken by a person and ambient sound other than the voice of a speaker, and the voice processor 101 may carry out processing, such as feature amount extraction, on the voice spoken by a person only.

Subsequently, in step S402, the communication portion 202 in the speaker identification device 200 sends the speaker voice signal generated by the voice processor 101 to the server device 210, via the network 220. In this case, when speaker identification devices 200 are connected to one server device 210, identification information specifying the speaker identification device 200 may be sent together with the speaker voice signal.

Subsequently, in step S403, the identification processor 103 of the controller 211 of the server device 210 acquires the registered voice signals 801 stored in the voice DB 203, via the database manager 102. The identification processor 103 then specifies the registered voice signal 801 (speaker) which matches the speaker voice signal, by comparing the acquired registered voice signals 801 with the speaker voice signal acquired from the speaker identification device 200 via the communication portion 212 in step S402. Step S403 corresponds to step S302 shown in FIG. 5.

Consequently, in step S404, the identification processor 103 in the controller 211 extracts the registration icon 803 corresponding to the specified registered voice signal 801, via the database manager 102. For example, in FIG. 3, the icons A01, B05 are registered respectively as registration icons 803, for the speakers whose registered voice signals 801 are "0001.wav" and "0003.wav", respectively. Therefore, the identification processor 103 may extract the respective registration icons 803 relating to these speakers.

Furthermore, in the example in FIG. 3, a registration icon 803 is not registered for the speaker whose registered voice signal 801 is "0002.wav". In this case, the identification processor 103 of the controller 211 may extract an icon automatically from icons created previously. Furthermore, in a case where the speaker voice signal acquired from the speaker identification device 200 does not correspond to any of the registered voice signals 801, the identification processor 103 of the controller 211 may similarly extract a suitable icon which is analogous to the acquired speaker voice signal, from icons created previously. Alternatively, the identification processor 103 may create a suitable icon which is analogous to the speaker voice signal, if a registration icon 803 corresponding to the speaker voice signal acquired from the speaker identification device 200 is not registered in the voice information 800. This point applies similarly in the case of the speaker identification system having the configuration shown in FIG. 1.

Subsequently, in step S405, the communication portion 212 of the server device 210 sends the icon extracted by the identification processor 103 in step S404, to the speaker identification device 200, via the network 220.

Subsequently, in step S406, the display controller 104 of the controller 205 of the speaker identification device 200 causes the display 204 to display the icon sent in step S405. Step S406 corresponds to step S303 shown in FIG. 5.

In this case, as described above, the voice processor 101 outputs an acquisition signal indicating that voice by a speaker has been acquired by the voice acquisition portion 201, only while the voice is being acquired, to the display controller 104, for each respective speaker. The display controller 104 causes the display 204 to display an icon, while an acquisition signal is being input from the voice processor 101, in other words, while voice of the specified speaker is being recognized.

The display controller 104 erases an icon which is being displayed on the display 204, when voice indicating a speaker specified from the voice of the speaker acquired by the voice acquisition portion 201 has ceased for a prescribed period of time, in other words, when a prescribed time (in the first embodiment, 10 seconds, for example) has elapsed without input of an acquisition signal from the voice processor 101. In this case, the display controller 104 may gradually increase the transparency of the displayed icon such that the icon fades out from the display 204.

FIGS. 8A to 8H are diagrams respectively illustrating concrete display examples of registration icons 803 which are displayed on the display 204 by the display controller 104, in the speaker identification system illustrated in FIG. 1 or FIG. 6. The display components illustrated in FIGS. 8A to 8H are merely examples, and may include display components other than the display components illustrated in FIGS. 8A to 8H, or a portion of the display components may be omitted.

In FIG. 8A, a symbol corresponding to the speaker specified in step S403 is used as an icon, and the symbols are distinguished by color and displayed in the bottom right-hand corner of the display 204 of the speaker identification device 200. In the example in FIG. 8A, the icon 911 is a circular symbol, the icon 912 is a square symbol, and the icon 913 is a triangular symbol. As described above, in step S406, the display controller 104 displays icons represented by these symbols, on the display 204, while the speaker is speaking and for a prescribed time thereafter. By displaying the icons in this way, the user is able to confirm the results of the speaker identification without excessively disturbing the display of the television broadcast.

Here, at the timing shown in FIG. 8A, three people corresponding to the icon 911, the icon 912 and the icon 913 are speaking simultaneously. For example, at a certain timing, if a prescribed time (in this first embodiment, 10 seconds, for example) has elapsed after the speaker corresponding to the icon 912 has stopped speaking, then the display controller 104 erases the icon 912 only. As a result of this, a state is achieved in which only the icon 911 and the icon 913 are displayed on the display 204.

At this time, the display controller 104 may cause the position where the icon 911 is displayed to slide to the right in such a manner that the icon 911 is displayed directly alongside the icon 913. Consequently, the icons are gathered in the bottom right corner of the display 204 at all times, and therefore excessive obstruction of the television broadcast display can be suppressed.

The display controller 104 may make the color of the icon semi-transparent, when the speaker stops speaking, rather than erasing the icon. Alternatively, the display controller 104 may make the icon smaller in size, when the speaker stops speaking. By this means also, similar effects are obtained.

Furthermore, the icons corresponding to the recognized speakers may be displayed for a fixed time, and displayed from the right or from the left in the order in which the speakers speak. In the example in FIG. 8A, the corresponding speakers are shown as speaking in the order of the icons 911, 912, 913 or in the order of the icons 913, 912, 911. Of course, the icons may also be displayed in the order from top to bottom or from bottom to top. Therefore, the order of the display of icons is changed each time someone speaks. Consequently, it is possible to prompt the user to speak.

Furthermore, as shown in FIG. 8A, the display controller 104 may display a supplementary icon 914 for a period during which the person is speaking, along with the icon representing the speaker who is speaking, of the recognized speakers. In the example in FIG. 8A, an icon which places a circular shaped frame around the icon representing the speaker who is speaking is employed as the supplementary icon 914, thereby indicating that the speaker corresponding to the icon 911 is currently speaking.

In this case, the display controller 104 determines the icon at which the supplementary icon 914 is to be displayed, on the basis of the acquisition signal output from the voice processor 101 for each speaker. Accordingly, the icons 912, 913 which indicate speakers who have been recognized to be near the speaker identification device 200, and the icon 911 which indicates the speaker who is currently speaking, can be displayed in a clearly distinguished fashion.

As shown in FIG. 8B, the display controller 104 may use the icons 915 to 918 which schematically represent a human form, as the icons displayed on the display 204, rather than symbols such as those shown in FIG. 8A. As described above, the user may select or create these icons 915 to 918, or the controller 211 of the server device 210 or the controller 205 of the speaker identification device 200 may be devised so as to select the icons. In this case, similarly to FIG. 8A, the display controller 104 may display the supplementary icon 914 on the display 204.

Furthermore, the display controller 104 may display the contents spoken by the speaker on the icon or near the icon, each time the speaker speaks. In this case, the display controller 104 may display the icons in semi-transparent fashion at all times, for example, and may display the spoken contents only while the speaker is speaking.

In FIG. 8B, the voice acquisition portion 201 or the voice processor 101 has a function for controlling directionality. Consequently, the controller 205 can impart directionality to the direction in which the speakers are positioned in front of the display 204, and detect the direction in which the speaker is positioned. Therefore, as shown in FIG. 8B, the display controller 104 may change the position at which the icon is displayed, in accordance with the direction in which the detected speaker is positioned. From the example in FIG. 8B, it can be seen that the speakers corresponding to the icons 915, 916 are positioned on the left-hand side of the center line of the display 204, and that the speakers corresponding to the icons 917, 918 are positioned on the right-hand side of the center line of the display 204. By displaying the icons in this way, the user is able to confirm readily the results of speaker identification.

Figure 8C:
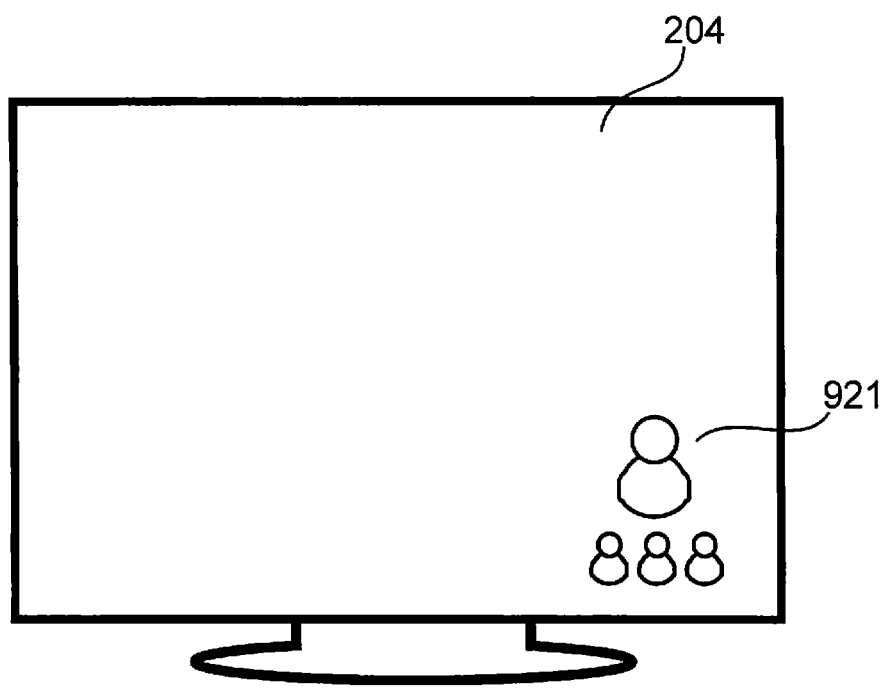
FIG. 8C is a diagram showing a concrete display example of a registration icon which is displayed on the display, in the speaker identification system in FIG. 1 or FIG. 6.

As shown in FIG. 8C, if speakers start to speak at once, then the display controller 104 may display a provisionally set icon 921, at a large size, for a speaker who is newly registered in the voice DB 203.

Here, "newly registered" is performed as follows. When the speaker speaks, the registered voice signal 801 for this speaker is not registered in the voice information 800. Therefore, the identification processor 103 registers the speaker voice signal generated by the voice processor 101 in the voice information 800, as a registered voice signal 801, via the database manager 102. The identification processor 103 judges the attribute of the speaker from the speaker voice signal. The identification processor 103 provisionally sets an icon on the basis of the judgment result, and registers the icon as a registration icon 803 in the voice information, via the database manager 102. In this way, a speaker who was not registered is newly registered in the voice DB 203.

Consequently, the user is able to confirm the new speaker. Furthermore, it is possible to prompt the user to change the provisionally set icon to a desired icon, by selecting or creating an icon for the new speaker.

Figure 8D:
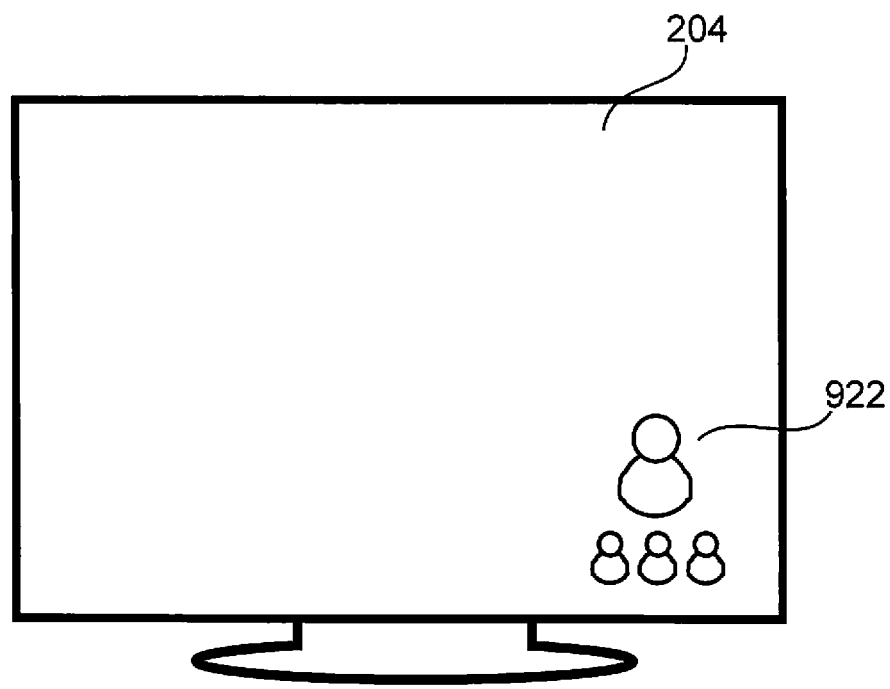
FIG. 8D is a diagram showing a concrete display example of a registration icon which is displayed on the display, in the speaker identification system in FIG. 1 or FIG. 6.

If speakers have spoken, then the display controller 104 may display an icon corresponding to a speaker having the longest speaking time or the greatest number of speaking actions, at a larger size, as shown in FIG. 8D. In this case, the identification processor 103 counts the speaking time or the number of speaking actions for each speaker, and stores the count value in the voice DB 203 via the database manager 102. The display controller 104 acquires the stored count value from the voice DB 203, via the database manager 102.

In the example in FIG. 8D, it can be seen that the speaking time or the number of speaking actions of the speaker corresponding to the icon 922 is the greatest. By this means, it is possible to prompt the speakers to speak. By prompting the speakers to speak, it is possible to increase the amount of voice information 800 which is stored in the voice DB 203. Consequently, more accurate speaker recognition becomes possible.

Figure 8E:
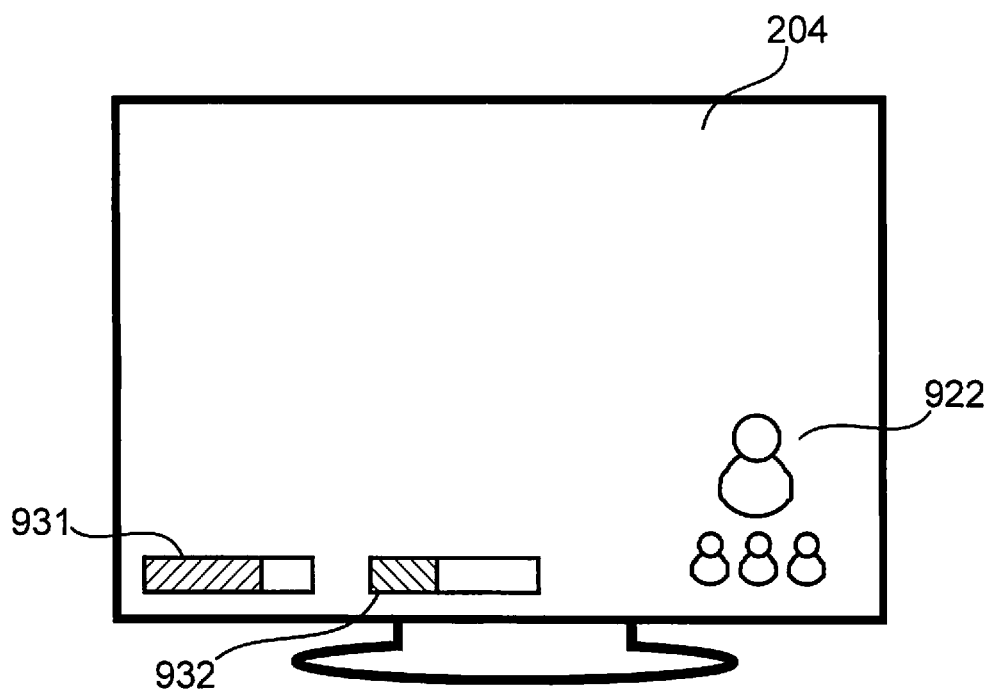
FIG. 8E is a diagram showing a concrete display example of a registration icon which is displayed on the display, in the speaker identification system in FIG. 1 or FIG. 6.

Rather than displaying the icon 922 at a larger size as in FIG. 8D, the display controller 104 may display speech amount display sections 931, 932 on the display 204, as shown in FIG. 8E. The speech amount display sections 931, 932 display the speech amount based on the speaking time or the number of speaking actions, in the form of a bar. The speech amount increases, the longer the speaking time or the greater the number of speaking actions.

The speech amount display section 931 represents the speech amount in units of the household which owns the speaker identification device 200, for example. The speech amount display section 932 represents the average value of the speech amount in all of the speaker identification devices 200 connected to the server device 210, for example. The speech amount display section 932 may represent the average value of the speech amount in the speaker identification devices 200 where people are watching the same television broadcasting program, of all of the speaker identification devices 200 which are connected to the server device 210.

In the case of FIG. 8E, the speakers are prompted to speak, for instance, when the level of the speech amount display section 931 is low compared to the level of the speech amount display section 932. Furthermore, the controller 211 of the server device 210 can collect data indicating whether or not the user is keenly watching a television broadcast program or commercial that is currently being shown, on the basis of the level of the speech amount display section 931.

In the case of the speaker identification system in FIG. 1, the display controller 104 is able to display the speech amount display section 931 only. The display of the speech amount display section 932 by the display controller 104 is achieved by the speaker identification system shown in FIG. 6.

Figure 8F:
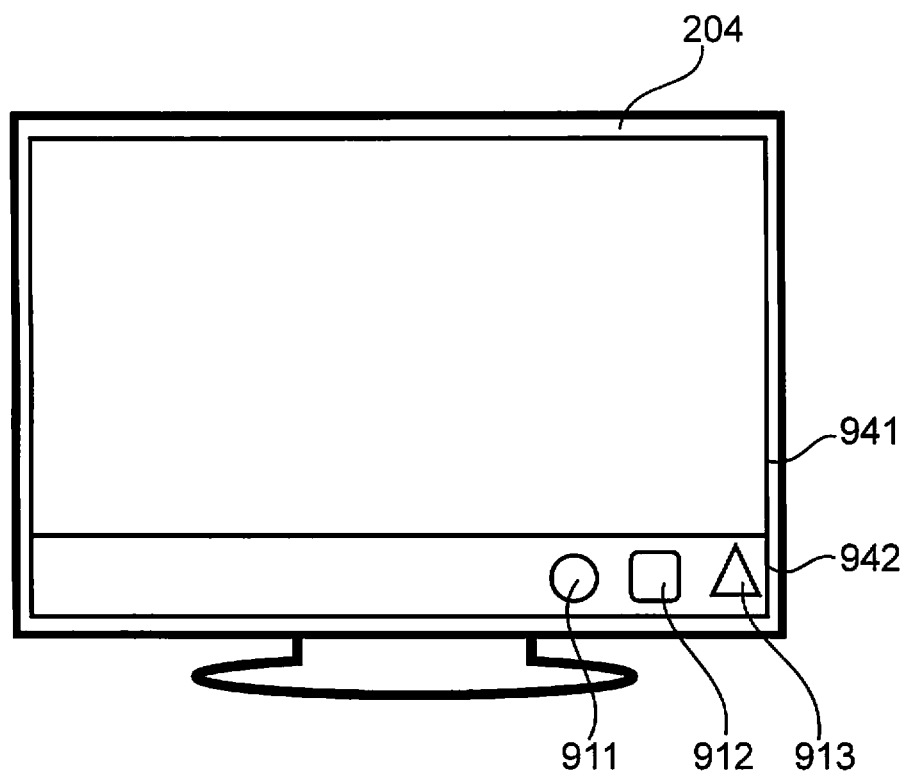
FIG. 8F is a diagram showing a concrete display example of a registration icon which is displayed on the display, in the speaker identification system in FIG. 1 or FIG. 6.

As shown in FIG. 8F, the display controller 104 may reduce the main display region 941 which displays a television broadcast program, from the whole display screen of the display 204, when displaying the icons 911 to 914 on the display 204. The display controller 104 may provide a subsidiary display region 942 at the outside of the main display region 941 and may display the icons 911 to 914 in this subsidiary display region 942. Consequently, it is possible to avoid situations where the viewing of the television broadcast program is impeded excessively by the display of the icons 911 to 914.

Figure 8G:
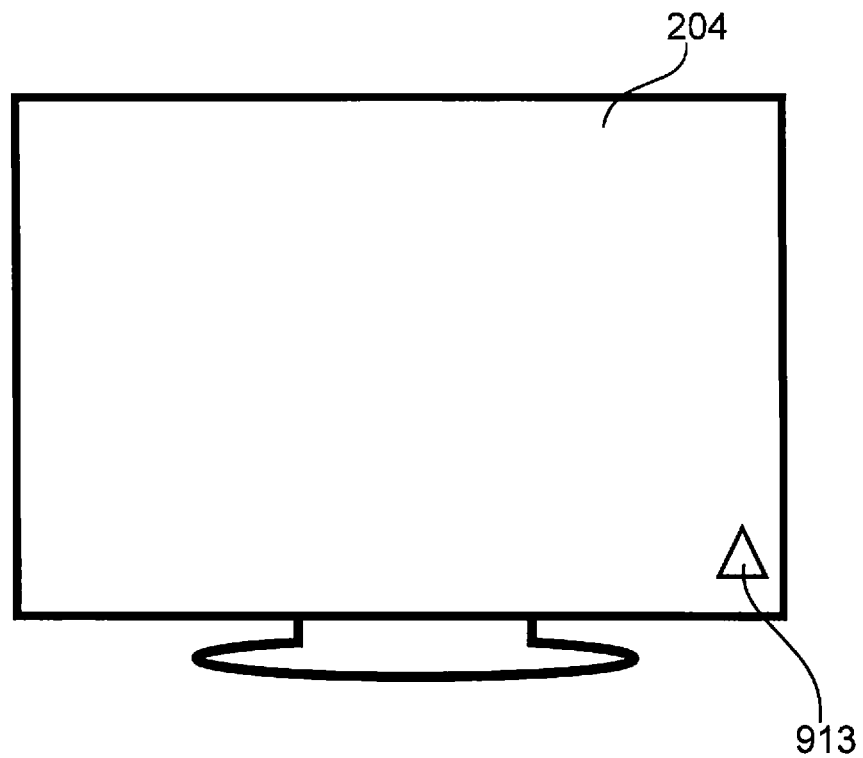
FIG. 8G is a diagram showing a concrete display example of a registration icon which is displayed on the display, in the speaker identification system in FIG. 1 or FIG. 6.
Figure 8H:
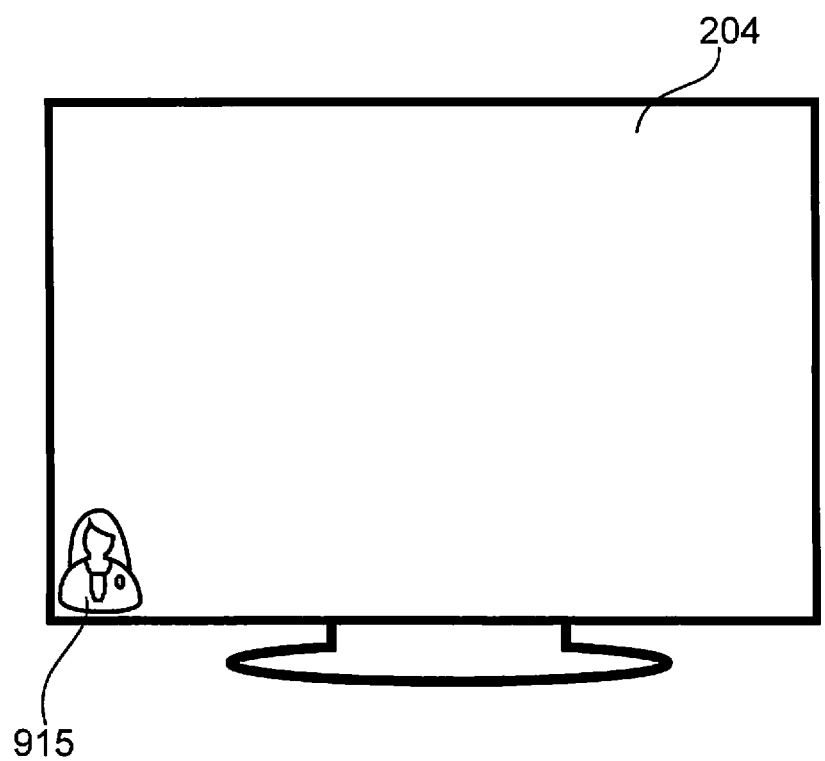
FIG. 8H is a diagram showing a concrete display example of a registration icon which is displayed on the display, in the speaker identification system in FIG. 1 or FIG. 6.

In FIGS. 8A to 8F, icons are displayed on the display 204, but as shown in FIGS. 8G and 8H, there may also be cases where one icon is displayed on the display 204. For example, in FIG. 8A, in cases where only the speaker corresponding to the icon 913 continues speaking, and the speakers corresponding to the icons 911 and 912 have stopped speaking, when a prescribed time (in the first embodiment, 10 seconds, for example) has elapsed since the speakers stopped speaking, the display controller 104 displays only the icon 913 on the display 204, and erases the other icons, as shown in FIG. 8G.

For example, in FIG. 8B, in cases where only the speaker corresponding to the icon 915 continues speaking, and the speakers corresponding to the icons 916 to 918 have stopped speaking, when a prescribed time (in the first embodiment, 10 seconds, for example) has elapsed since the speakers stopped speaking, the display controller 104 displays only the icon 915 on the display 204, and erases the other icons, as shown in FIG. 8H.

As described above, according to the speaker identification system of the first embodiment, it is possible to display the speaker identification results clearly to the user, while suppressing the obstruction of display of the contents that are originally to be displayed on the display 204 (for example, a television broadcast program in a case where the display 204 is a TV display screen).

The configuration illustrated in FIG. 1 and FIG. 6 is merely one example of a speaker identification system according to the first embodiment, and components other than the configuration shown in FIG. 1 and FIG. 6 may be provided, or a portion of the configuration may be omitted. Furthermore, either of FIG. 1 or FIG. 6 may be adopted, and devices other than those illustrated may also be employed in the speaker identification system according to the first embodiment.

Second Embodiment

A speaker identification system according to a second embodiment is described below. In this second embodiment, descriptions which are similar to those of the first embodiment have been partially omitted. Furthermore, it is also possible to combine the technology according to the second embodiment with the technology according to the first embodiment.

The configuration of the speaker identification system according to the second embodiment is similar to the speaker identification system according to the first embodiment which is shown in FIG. 1 or FIG. 6, and therefore detailed description thereof is omitted here. In the second embodiment, the composition which is the same as the first embodiment is illustrated using the same reference numerals. In the second embodiment, the input accepting portion 206 shown in FIG. 1 or FIG. 6 is an essential part of the configuration.

Figure 9:
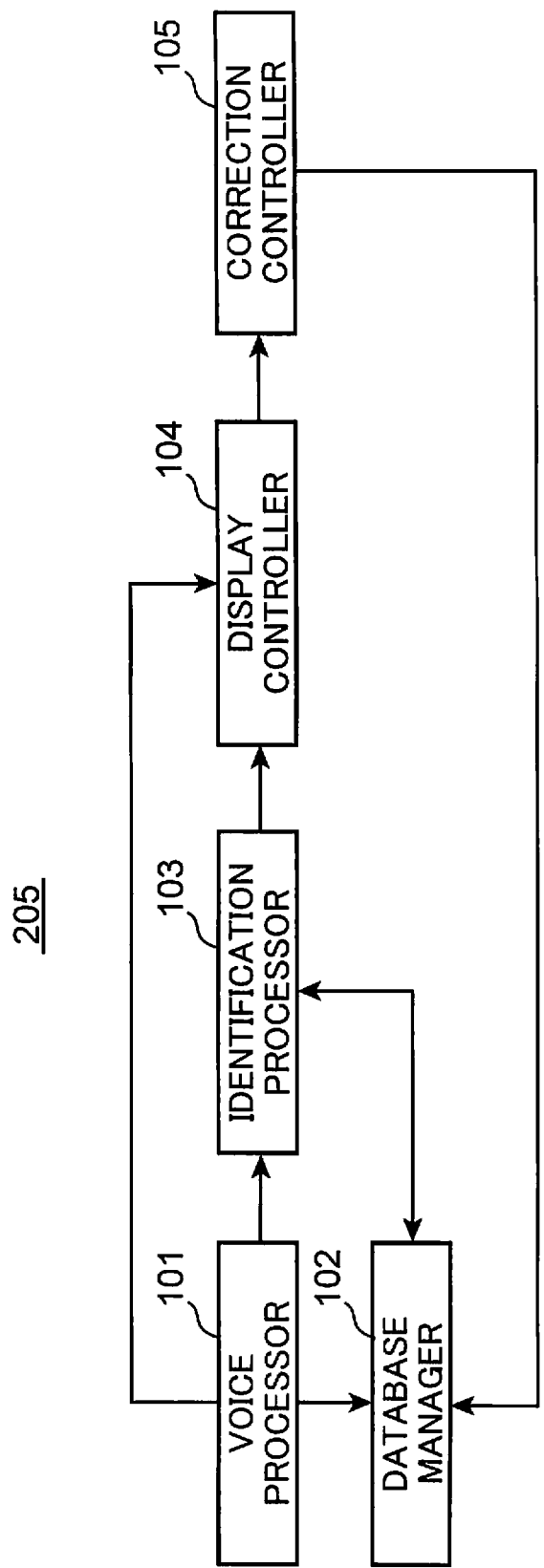
FIG. 9 is a block diagram showing functions of a controller of the speaker identification device illustrated in FIG. 1 according to the second embodiment.

FIG. 9 is a block diagram showing functions of a controller 205 of the speaker identification device 200 illustrated in FIG. 1, according to the second embodiment. The difference with respect to the first embodiment illustrated in FIG. 2 is that a correction controller 105 is provided. By means of this correction controller 105, when the icon extracted by the identification processor 103 is erroneous, it is possible for the user to make a correction and thereby update the information in the voice DB 203. According to a configuration of this kind, in the second embodiment, the information identified by the identification processor 103 can be corrected easily. The concrete operations of the correction controller 105 are described next with reference to FIG. 10.

Figure 10:
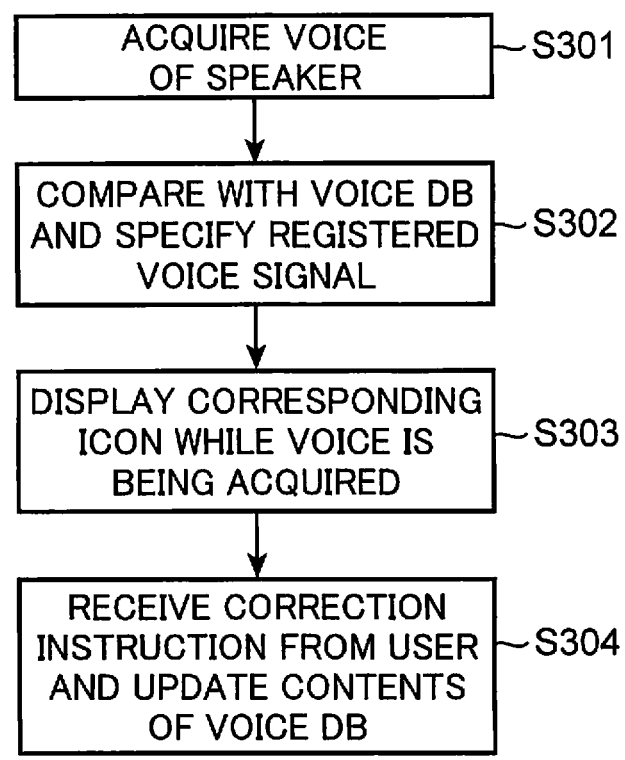
FIG. 10 is a flowchart showing processing in the speaker identification system in FIG. 1 according to the second embodiment.

FIG. 10 is a flowchart showing processing in the speaker identification device 200 which is illustrated in FIG. 1 of the speaker identification system according to the second embodiment. Steps S301 to S303 are similar to steps S301 to S303 in FIG. 5.

Following step S303, in step S304, the correction controller 105 receives a correction instruction from the user, in respect of the icon corresponding to a speaker. The user makes a correction instruction using the input accepting portion 206. The correction controller 105 updates the contents of the voice DB 203 via the database manager 102, in accordance with the contents of the correction instruction made by the user.

Here, in step S304, the correction controller 105 may implement control so as to receive a correction instruction from the user, only when an icon is being displayed in step S303. Therefore, it is possible to reduce the incidence of a correction instruction being received accidentally at a time when corrected is not intended. Moreover, in this case, the correction controller 105 may, via the display controller 104, cause the display 204 to display an indication that a correction instruction can be received from the user, while an icon is being displayed. Consequently, the user is able to ascertain that there is a correction function.

Figure 11A:
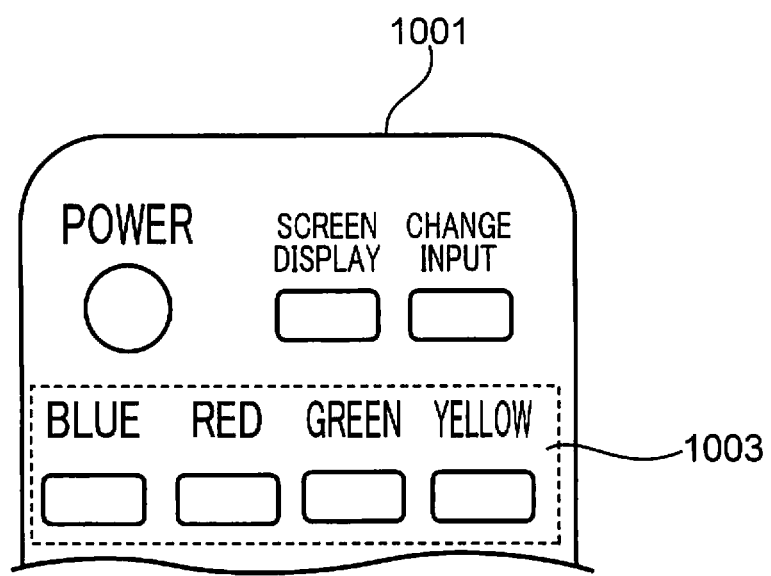
FIG. 11A is a diagram showing one example of an input accepting portion which is used for correction instruction by a user.
Figure 11B:
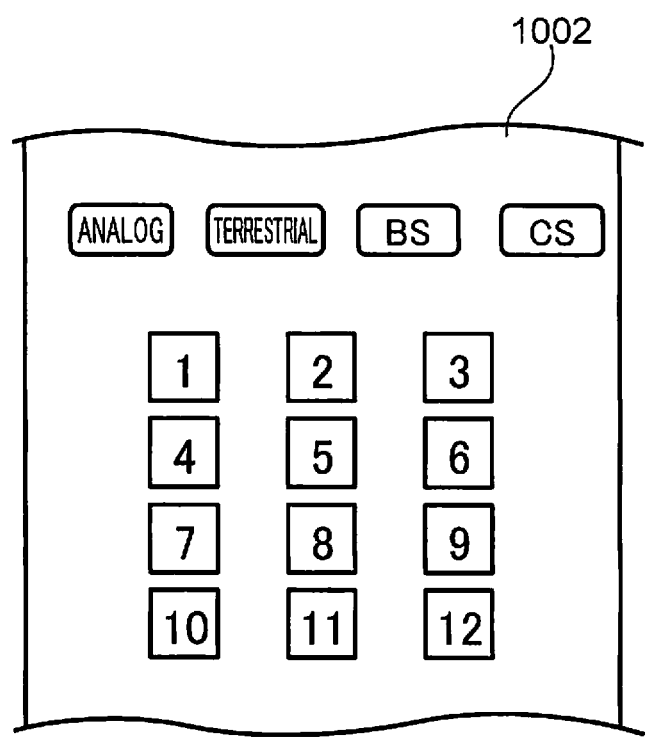
FIG. 11B is a diagram showing one example of an input accepting portion which is used for correction instruction by a user.

FIGS. 11A and 11B are diagrams showing one example of the input accepting portion 206 which is used by a user to make a correction instruction in step S304 in FIG. 10. A method whereby a user makes a correction instruction with respect to an icon using the input accepting portion 206 in step S304 in FIG. 10 is now described with reference to FIGS. 11A and 11B. FIG. 11A shows a remote controller 1001 which is one example of the input accepting portion 206. FIG. 11B shows a remote controller 1002 which is another example of the input accepting portion 206.

In step S303 in FIG. 10, if an icon is displayed erroneously on the display 204, then the user sends a correction instruction using the remote controller 1001, for example (step S304 in FIG. 10). An icon being displayed erroneously on the display 204 means, for instance, that the supplementary icon 914 is displayed erroneously on the icon 916 indicating another speaker, as shown in FIG. 8B, while the speaker corresponding to the icon 915 is speaking.

Here, each of the color buttons 1003 in the remote controller 1001 in FIG. 11A is associated previously with each of the icons. For example, in FIG. 8B, the icon 915, the icon 916, the icon 917 and the icon 918 are associated respectively with the "blue" button, the "red" button, the "green" button and the "yellow" button. In this case, desirably, the colors associated respectively with the icons 915 to 918 are displayed in superimposed fashion so as to be identified by the user.

The speakers and each of the color buttons 1003 on the remote controller do not have to be associated with each other in advance. For example, correction may be performed by pressing any of the color buttons 1003. Furthermore, the "blue", "red", "green" and "yellow" buttons may be associated in this order, from the left-hand side of the position where the icons are displayed.

As the correction instruction in step S304 in FIG. 10, the speaker corresponding to the icon 915 speaks while pressing down the "blue" button on the remote controller 1001. In so doing, the supplementary icon 914 moves onto the icon 915, and a correct speaker image can be displayed in relation to the registered icon. Consequently, even if the identification results are displayed erroneously, the user can make a correction simply by selecting the color button 1003 on the remote controller 1001 which is associated with the speaker and sending a correction instruction.

Furthermore, it is also possible to use the remote controller 1002 shown in FIG. 11B, instead of the remote controller 1001 shown in FIG. 11A. In the remote controller 1002 shown in FIG. 11B, similarly, the icons may be associated with number buttons on the remote controller 1002. In this case, the user is able to send a correction instruction by speaking while pressing down the number button corresponding to the remote controller 1002.

The method for the user to send a correction instruction is not limited to that described above. For example, if the corresponding button on the remote controller is pressed, the display controller 104 may switch the display on the display 204 to a settings page which enables correction.

Returning to FIG. 10, the updating of the contents in the voice DB 203 which is performed in step S304 will now be described. There is a high probability that the reason why the supplementary icon 914 is displayed erroneously on the icon 916 indicating another speaker as shown in FIG. 8B, while the speaker corresponding to the icon 915 is speaking, is because the registered voice signal 801 (FIG. 3) of the speaker corresponding to the icon 915 does not accurately represent the feature vector.

Therefore, when the speaker corresponding to the icon 915 speaks while pressing the "blue" button on the remote controller 1001, the voice processor 101 generates a feature vector from the voice acquired by the voice acquisition portion 201, and generates a speaker voice signal representing the feature vector thus generated. The database manager 102 then receives the generated speaker voice signal via the identification processor 103, and the registered voice signal 801 of the speaker corresponding to the icon 915 in the voice DB 203 is overwritten with the generated speaker voice signal.

Another example of the updating of the contents of the voice DB 203 which is performed in step S304 is described now with reference to FIG. 3 and FIGS. 8B and 8H.

The color buttons 1003 on the remote controller 1001 are associated with the three speakers in FIG. 3. For example, the speaker whose registered voice signal 801 is "0001.wav" is associated with the "blue" button, the speaker whose registered voice signal 801 is "0002.wav" is associated with the "red" button, and the speaker whose registered voice signal 801 is "0003.wav" is associated with the "green" button. Furthermore, the registration icon "A01" in FIG. 3 is the icon 916 in FIG. 8B. Moreover, the registration icon "B05" in FIG. 3 is the icon 915 in FIGS. 8B and 8H.

In this case, the icon 915 is displayed on the display 204, as shown in FIG. 8H, despite the fact that the speaker whose registered voice signal 801 is "0001.wav" is speaking. There is a high probability that the reason for this is that the registered voice signal "0001.wav" in FIG. 3 does not accurately represent the feature vector.

Therefore, the speaker whose registered voice signal 801 is "0001.wav" (in other words, the speaker corresponding to the icon 916) speaks while pressing the "blue" button of the remote controller 1001. The voice processor 101 generates a feature vector from the voice acquired by the voice acquisition portion 201, and generates a speaker voice signal which represents the generated feature vector. The database manager 102 then receives the generated speaker voice signal via the identification processor 103, and the registered voice signal "0001.wav" in the voice DB 203 is overwritten with the generated speaker voice signal.

FIG. 12 is a sequence diagram showing one example of an operation in the speaker identification system shown in FIG. 6 according to the second embodiment. In FIG. 12, the database manager 102 and the identification processor 103, of the functions illustrated in FIG. 9, are included in the controller 211 of the server device 210, and the voice processor 101, the display controller 104 and the correction controller 105 are included in the controller 205 of the speaker identification device 200. Furthermore, here, an example of the operation of a speaker identification system which includes the server device 210 and the speaker identification device 200 shown in FIG. 6 is described, but this is merely an example and does not limit the present embodiment.

Steps S401 to S406 are similar to steps S401 to S406 shown in FIG. 7, and therefore detailed description thereof is omitted.

Following step S406, in step S407, the correction controller 105 receives a correction instruction from the user, in respect of the icon, which is made using the input accepting portion 206. Step S407 corresponds to a portion of step S304 shown in FIG. 10. In other words, the correction instruction made by the user is carried out similarly to step S304 in FIG. 10.

Following step S407, in step S408, the communication portion 202 of the speaker identification device 200 sends a correction instruction from the user, which has been received by the correction controller 105, to the server device 210.

Subsequently, in step S409, the database manager 102 of the server device 210 updates the contents of the voice DB 203 on the basis of the correction instruction made by the user. Step S409 corresponds to a portion of step S304 shown in FIG. 10. In other words, the updating of the voice DB 203 is performed similarly to step S304 in FIG. 10.

As described above, according to the speaker identification system of the second embodiment, if the icon displayed on the display 204 as a speaker identification result is a different icon due to erroneous identification, then the user can instruct a correction without performing a bothersome operation. If there is an erroneous detection in the speaker identification results, and this result is displayed without alteration, then the user may be caused discomfort. However, with the second embodiment, it is possible to resolve discomfort of this kind caused to the user. Moreover, the user is also prompted to correct the voice DB 203. Consequently, it is possible to construct a voice DB 203 for a family, more accurately.

(Others)

(1) In the second embodiment described above, the correction controller 105 in FIG. 9 may receive a correction instruction made by the user using the input accepting portion 206, only when an erroneous icon is displayed on the display 204. For example, in the example described by using FIG. 8B in step S304 in FIG. 10, the correction controller 105 receives a correction instruction made by the user using the remote controller 1001, only when the supplementary icon 914 is being displayed erroneously on the display 204. For example, in the example described by using FIG. 3 in step S304 in FIG. 10, the correction controller 105 receives a correction instruction made by the user using the remote controller 1001, only when the icon "B05" is being displayed erroneously on the display 204.

In this case, the display controller 104 may output information relating to the icons being displayed on the display 204, to the correction controller 105. The correction controller 105 may judge whether or not the correction instruction made by the user using the input accepting portion 206 is a correction instruction for the icon being displayed on the display 204, on the basis of information relating to the icons being displayed on the display 204 which is input from the display controller 104. The correction controller 105 may be devised so as to receive a correction instruction only when the correction instruction made by the user using the input accepting portion 206 is a correction instruction for the icon being displayed on the display 204.

In this way, by limiting the period during which a correction instruction made by the user using the input accepting portion 206 can be received, it is possible to avoid a situation where a correction instruction relating to an icon that is not being displayed on the display 204, or an erroneous correction instruction performed by the user, is received.

(2) In the first and second embodiments described above, as shown in FIGS. 8A to 8F, the display 204 which displays the icon is a display screen of a TV, which is the speaker identification device 200. However, the present disclosure is not limited to this. For example, the display 204 may be a display screen of a portable device, such as a tablet device or a smartphone. The display controller 104 may display icons on the display screen of the portable device, via the communication portion 202.

(3) In the first and second embodiments described above, when the identification processor 103 judges that two speaker voice signals input consecutively from the voice processor 101 match the speakers whose registered voice signals 801 are "0001.wav" and "0003.wav" in the voice information 800 in FIG. 3, the identification processor 103 can judge that a father and child are watching a television broadcast program together, on the basis of the user information 802 in FIG. 3.

Alternatively, when the identification processor 103 judges that two speaker voice signals input consecutively from the voice processor 101 match the speaker whose registered voice signals 801 are "0001.wav" and "0002.wav" in the voice information 800 in FIG. 3, the identification processor 103 can judge that only adults are watching a television broadcast program, on the basis of the user information 802 in FIG. 3.

Therefore, the display controller 104 may recommend, to the viewers, content (for example, a television broadcast program) that is suitable for the viewers using the display 204, on the basis of the viewer judgment results by the identification processor 103.

(Overview of Service Provided)

FIG. 13A is a diagram showing an overview of the speaker identification system shown in FIG. 6 in the first and second embodiments described above.

A group 1100 is, for example, a business, organization, household, or the like, and the scale thereof is not limited. Appliances 1101 (for example, appliance A and appliance B) and a home gateway 1102 are present in the group 1100. The appliances 1101 include appliances which can connect to the Internet (for example, a smartphone, personal computer, TV, etc.). Furthermore, the appliances 1101 include appliances which cannot themselves connect to the Internet (for example, lighting appliances, a washing machine, a refrigerator, etc.). The appliances 1101 may include appliances which cannot themselves connect to the Internet but can connect to the Internet via the home gateway 1102. Furthermore, users 1010 who use the appliances 1101 are present in the group 1100.

A cloud server 1111 is present in a data center operating company 1110. The cloud server 1111 is a virtualization server which operates in conjunction with various devices, via the Internet. The cloud server 1111 principally manages a large amount of data (big data) which is difficult to handle with normal database management tools and the like. The data center operating company 1110 operates, for example, a data center which manages data and manages the cloud server 1111. The details of the service performed by the data center operating company 1110 are described below.

Here, the data center operating company 1110 is not limited to being a company which only operates a data center which performs the data management and the cloud server 1111 management.

Figure 13B:
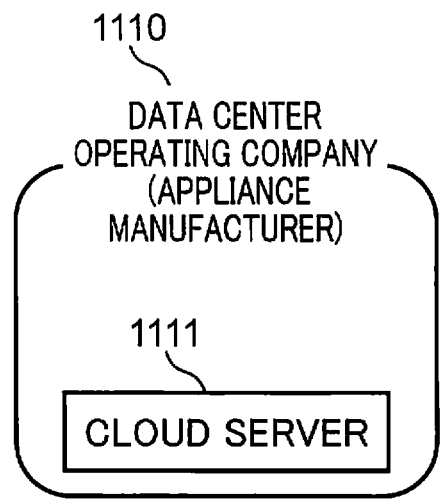
FIG. 13B is a drawing showing one example of a data center operating company.
Figure 13C:
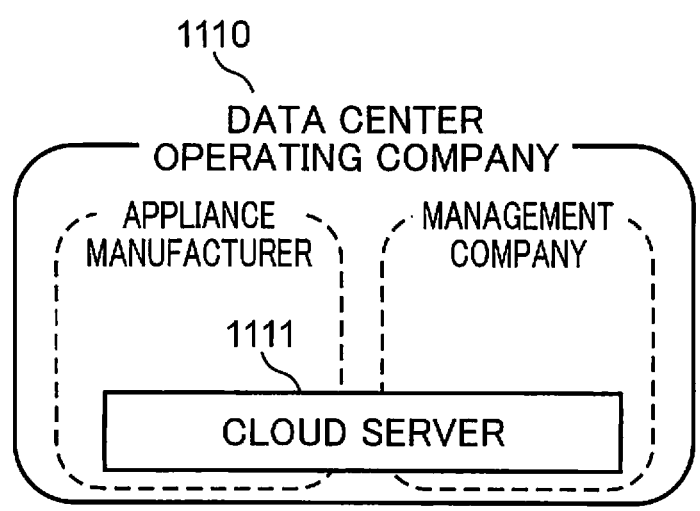
FIG. 13C is a drawing showing one example of a data center operating company.

FIG. 13B and FIG. 13C are diagrams showing one example of the data center operating company 1110. For example, if an appliance manufacturer which has developed or manufactured one appliance of the appliances 1101 also performs the data management and the cloud server 1111 management, and the like, then the appliance manufacturer corresponds to the data center operating company 1110 (FIG. 13B). Furthermore, the data center operating company 1110 is not limited to being one company. For example, if an appliance manufacturer and another management company perform the data management and the cloud server 1111 management, and the like, either jointly or on a shared basis, either one or both thereof corresponds to the data center operating company 1110 (FIG. 13C).

A service provider 1120 owns a server 1121. The server 1121 referred to here may be of any scale, and also includes, for example, a memory inside an individual personal computer. Furthermore, there are also cases where the service provider 1120 does not own the server 1121. In this case, the service provider 1120 owns a separate apparatus which performs the functions of the server 1121.

The home gateway 1102 is not essential in the speaker identification system described above. The home gateway 1102 is an apparatus which enables the appliances 1101 to connect to the Internet. Therefore, for example, when there is no appliance which cannot connect to the Internet itself, as in a case where all of the appliances 1101 in the group 1100 are connected to the Internet, the home gateway 1102 is not necessary.

Next, the flow of information in the speaker identification system will be described with reference to FIG. 13A.

Firstly, the appliances 1101 of the group 1100, appliance A or appliance B for instance, send respective operation log information to the cloud server 1111 of the data center operating company 1110. The cloud server 1111 collects the operation log information for appliance A or appliance B (arrow (a) in FIG. 13A). Here, the operation log information means information indicating the operating circumstances and operating date and time, and the like, of the appliances 1101. For example, this information includes: the TV viewing history, the recording schedule information of the recorder, the operation time of the washing machine and the amount of washing, the refrigerator opening and closing time and the number of opening/closing actions, and so on. The operation log information is not limited to the above, and means all of the information which can be acquired from any of the appliances 1101.

The operation log information may be supplied directly to the cloud server 1111 from the appliances 1101 themselves, via the Internet. Furthermore, the operation log information may be collected provisionally in the home gateway 1102 from the appliances 1101, and may then be supplied to the cloud server 1111 from the home gateway 1102.

Next, the cloud server 1111 of the data center operating company 1110 supplies the collected operation log information to the service provider 1120, in fixed units. Here, the "fixed unit" may be a unit which can be supplied to the service provider 1120 after ordering the information collected by the data center operating company 1110, or may be a unit requested by the service provider 1120. Although described as a "fixed unit", the amount of information does not have to be fixed. For example, the amount of information supplied may vary depending on the circumstances. The operation log information is stored in the server 1121 owned by the service provider 1120, according to requirements (arrow (b) in FIG. 13A).

The service provider 1120 orders the operation log information into information suited to the service provided to the user, and then supplies the information to the user. The user receiving the information may be the user 1010 of the appliances 1101, or may be an external user 1020. The method for providing the service to the user may involve directly providing the service to the user 1010, 1020 from the service provider 1120 (arrows (f) and (e) in FIG. 13A). Furthermore, the method for providing a service to the user may also involve providing a service to the user 1010 by passing through again the cloud server 1111 of the data center operating company 1110, for example (arrows (c) and (d) in FIG. 13A). Furthermore, the cloud server 1111 of the data center operating company 1110 may order the operation log information into information suited to the service provided to the user, and then supply the information to the service provider 1120.

The user 1010 and the user 1020 may be the same user or different users.

The technology described in the modes given above may be achieved by the following types of cloud services, for example. However, the types of service by which the technology described in the mode given above can be achieved are not limited to these.

(Service Type 1: Own Data Center Type)

FIG. 14 shows a service type 1 (own data center type). In this type of service, the service provider 1120 acquires information from the group 1100 and provides a service to the user. In this service, the service provider 1120 has the function of the data center operating company. In other words, the service provider 1120 owns the cloud server 1111 which manages "big data". Consequently, there is no data center operating company.

In the present type of service, the service provider 1120 runs and manages a data center (cloud server 1111) (1203). Furthermore, the service provider 1120 manages an OS (1202) and an application (1201). The service provider 1120 provides a service by using the OS (1202) and the application (1201) managed by the service provider 1120 (1204).

(Service Type 2: Using IaaS Type)

Figure 15:
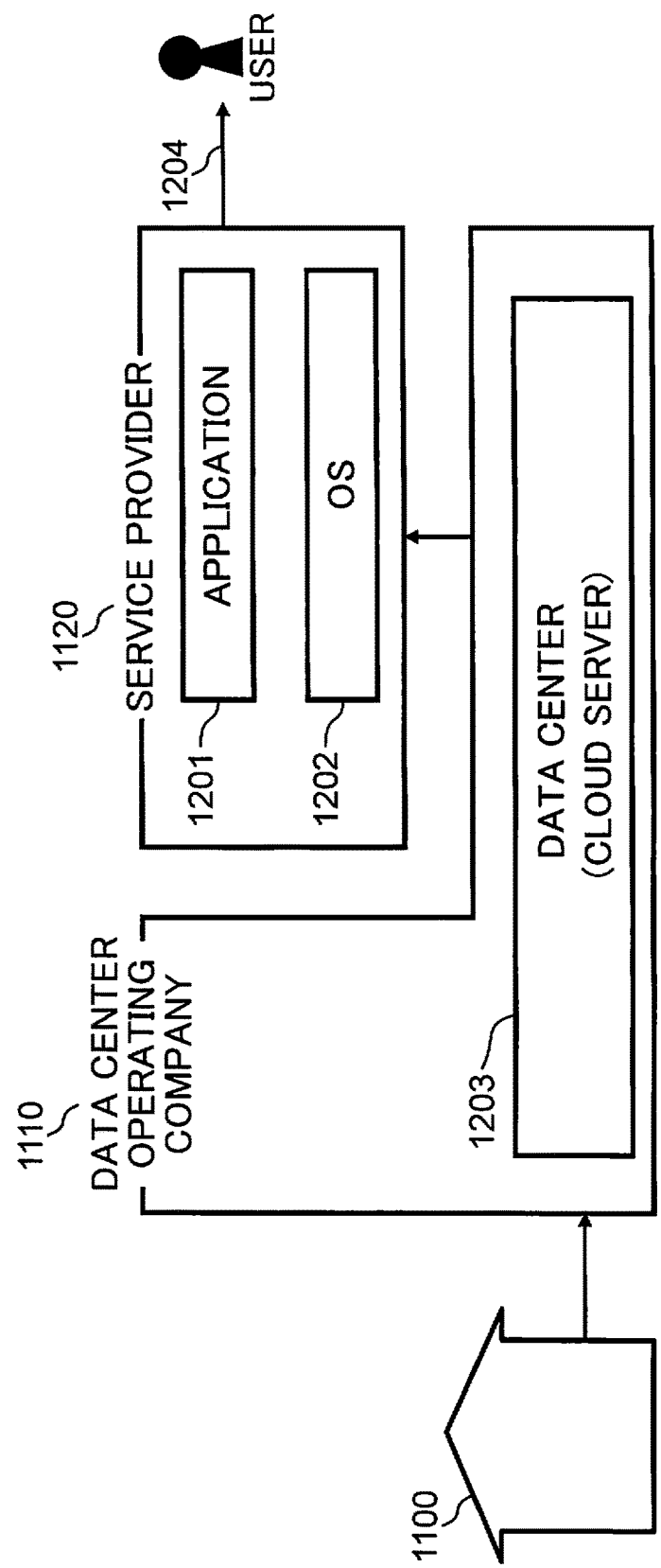
FIG. 15 is a diagram illustrating a type of service according to the embodiments (IaaS use type).

FIG. 15 shows a service type 2 (using IaaS type). Here, "IaaS" is an abbreviation of "Infrastructure as a Service", which is a cloud service provision model in which the actual basis for building and operating a computer system is provided as a service via the Internet.

In the present type of service, the data center operating company 1110 runs and manages a data center (cloud server 1111) (1203). Furthermore, the service provider 1120 manages an OS (1202) and an application (1201). The service provider 1120 provides a service by using the OS (1202) and the application (1201) managed by the service provider 1120 (1204).

(Service Type 3: Using PaaS Type)

Figure 16:
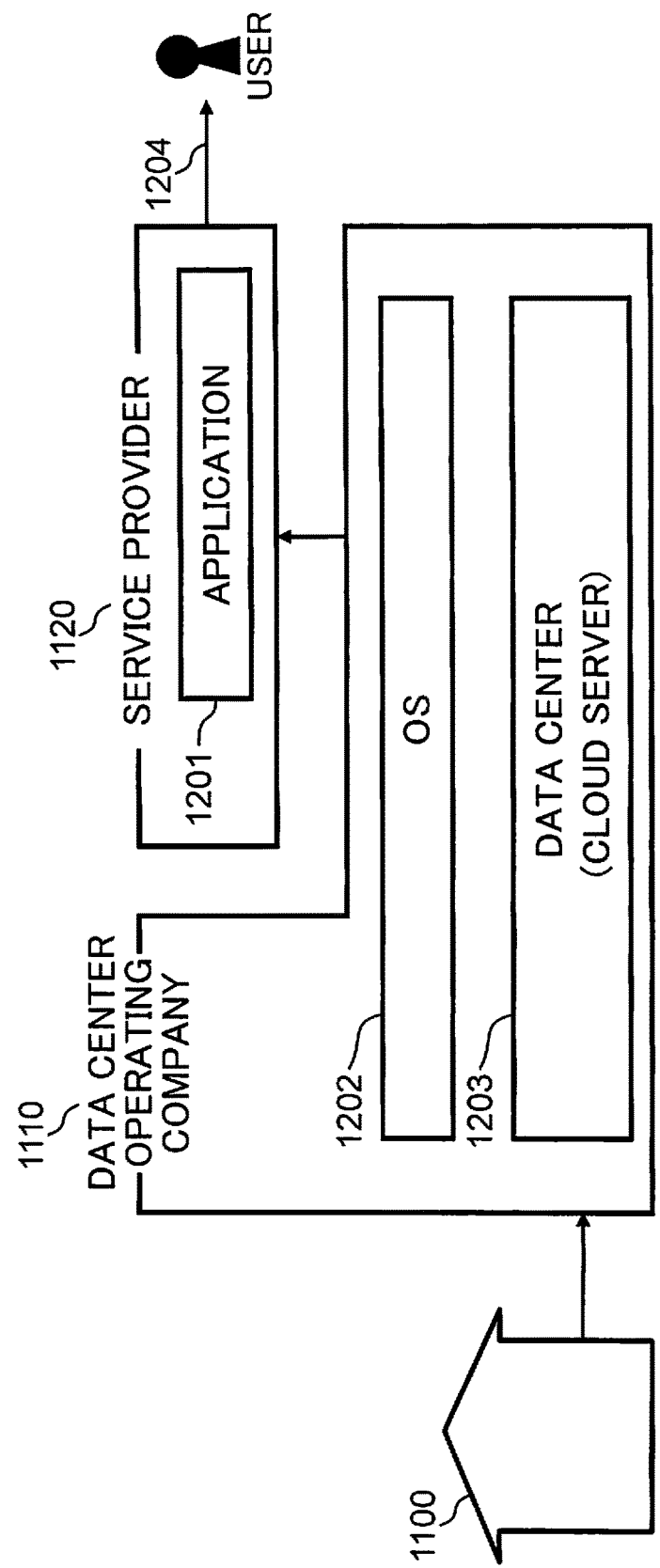
FIG. 16 is a diagram illustrating a type of service according to the embodiments (PaaS use type).

FIG. 16 shows a service type 3 (using PaaS type). Here, "PaaS" is an abbreviation of "Platform as a Service", which is a cloud service provision model in which a platform which is a foundation for building and operating software is provided as a service via the Internet.

In the present type of service, the data center operating company 1110 manages an OS (1202) and runs and manages a data center (cloud server 1111) (1203). Furthermore, the service provider 1120 manages an application (1201). The service provider 1120 provides a service by using the OS (1202) managed by the data center operating company 1110 and the application (1201) managed by the service provider 1120 (1204).

(Service Type 4: Using SaaS Type)

FIG. 17 shows a service type 4 (using SaaS type). Here, "SaaS" is an abbreviation of "Software as a Service". This is a cloud service provision model having a function by which, for example, an application provided by a platform provider which keeps the data center (cloud server) can be used by a company or individual (user) which does not keep a data center (cloud server), via a network, such as the Internet.

In the present type of service, the data center operating company 1110 manages an application (1201), manages an OS (1202), and runs and manages a data center (cloud server 1111) (1203). Furthermore, the service provider 1120 provides a service by using the OS (1202) and the application (1201) managed by the data center operating company 1110 (1204).

In any of the types of service described above, it is assumed that the service provider 1120 performs the action of providing a service. Furthermore, for example, the service provider 1120 or the data center operating company 1110 may itself develop an OS, an application or a "big data" database, or the like, or may contract the development thereof to a third party.

INDUSTRIAL APPLICABILITY

A speaker identification method, speaker identification device and speaker identification system according to the present disclosure is useful as a method, device and system for easily displaying speaker images representing identified speakers, when using speaker identification in an environment where there is an indeterminate speakers.

The invention claimed is:

1. A speaker identification method in a speaker identification system which identifies voice of a speaker positioned around a display to display a result of the identification on the display, the speaker identification system including a database which stores registered voice signals and speaker images, the registered voice signals being respectively generated based on voices of speakers, the speaker images being respectively associated with the registered voice signals and respectively representing the speakers, the method comprising:

acquiring voice of a speaker positioned around the display;

generating a speaker voice signal from the acquired voice of the speaker;

identifying a registered voice signal corresponding to the generated speaker voice signal, from the registered voice signals stored in the database; and displaying the speaker image, which is stored in the database and is associated with the identified registered voice signal, on the display, at least while the voice of the speaker which forms a basis of generation of the speaker voice signal is being acquired, when a correction instruction from a speaker in relation to the speaker image is received, newly acquiring voice of the speaker who has instructed the correction;

newly generating a speaker voice signal from the newly acquired voice of the speaker; and overwriting the registered voice signal, which is stored in the database and is associated with the speaker image for which the correction instruction has been made, with the newly generated speaker voice signal, wherein the speaker identification system includes a remote controller which has buttons to be pressed down, each of the buttons being associated previously with each of the speaker images, and a speaker whose speaker image has been erroneously displayed on the display performs the correction instruction by speaking while pressing down the button associated with the speaker image representing the speaker whose speaker image has been erroneously displayed on the display.

2. The speaker identification method according to claim 1, wherein the speaker image is displayed in a first display format while the voice of the speaker is being acquired, and is displayed in a second display format while the voice of the speaker is not being acquired after the voice of the speaker has been acquired.

3. The speaker identification method according to claim 1, further comprising:

detecting spoken contents of the speaker from the generated speaker voice signal; and displaying the detected spoken contents near the speaker image, while the voice of the speaker which forms a basis of generation of the speaker voice signal is being acquired.

4. The speaker identification method according to claim 1, wherein the speaker image being displayed is erased from the display, when a prescribed time period has elapsed from the time at which the voice of the speaker which forms a basis of generation of the speaker voice signal ceases to be acquired.

5. The speaker identification method according to claim 1, wherein, of the first speaker image and the second speaker image, the speaker image which has been registered later in the database is displayed on the display in a different mode from the speaker image which has been registered earlier in the database.

6. The speaker identification method according to claim 1, wherein the correction instruction from the speaker is received in respect of the speaker image which is being displayed on the display and is not received in respect of the speaker image which is not being displayed on the display.

7. The speaker identification method according to claim 1, further comprising:

judging an attribute of the speaker from the generated speaker voice signal, creating the speaker image based on the judged attribute of the speaker, and storing in the database, in association with each other: the generated speaker voice signal, the judged attribute of the speaker, and the created speaker image, wherein the generated speaker voice signal is stored in the database as the registered voice signal.

8. A speaker identification device, comprising:

a display;

a voice acquisition portion which acquires voice of a speaker positioned around the display;

a voice processor which generates a speaker voice signal from the acquired voice of the speaker;

a database which stores registered voice signals and speaker images, the registered voice signals being respectively generated based on voices of speakers, the speaker images being respectively associated with the registered voice signals and respectively representing the speakers;

an identification processor which identifies a registered voice signal corresponding to the generated speaker voice signal, from the registered voice signals stored in the database; and a display controller which displays the speaker images, which are stored in the database and are associated with the identified registered voice signals, respectively, on the display, at least while the voice acquisition portion is acquiring each of the voices of the speakers which form a basis of generation of the speaker voice signal; and a correction controller, wherein the speaker identification system includes a remote controller which has buttons, each of the buttons being associated previously with each of the speaker images, when a correction instruction from a speaker in relation to the speaker image is received, the voice acquisition portion newly acquires voice of the speaker who has instructed the correction, the voice processor newly generates a speaker voice signal from the newly acquired voice of the speaker, the correction controller overwrites the registered voice signal, which is stored in the database and is associated with the speaker image for which the correction instruction has been made, with the newly generated speaker voice signal, and a speaker whose speaker image has been erroneously displayed on the display performs the correction instruction by speaking while pressing down the button associated with the speaker image representing the speaker whose speaker image has been erroneously displayed on the display.

\* \* \* \* \*